United States Patent
Takeshita et al.

[11] Patent Number: 6,097,421
[45] Date of Patent: *Aug. 1, 2000

[54] SCANNING OPTICAL SYSTEM

[75] Inventors: Kenji Takeshita, Aichi-ken; Nobuo Kanai, Toyohashi, both of Japan

[73] Assignee: Minolta Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/740,870

[22] Filed: Nov. 4, 1996

[30] Foreign Application Priority Data

Oct. 16, 1995 [JP] Japan ................................ 8-273325
Nov. 10, 1995 [JP] Japan ................................ 7-293109
Nov. 10, 1995 [JP] Japan ................................ 7-293112

[51] Int. Cl.$^7$ ................................................. G02B 13/08
[52] U.S. Cl. ...................... 347/258; 347/256; 347/241; 347/244; 359/662; 359/668; 359/708; 359/717; 359/720
[58] Field of Search ........................ 347/217, 230, 347/241, 244, 256, 258; 359/668, 691, 708, 710, 711, 717, 720, 662

[56] References Cited

U.S. PATENT DOCUMENTS

| | | |
|---|---|---|
| 4,571,035 | 2/1986 | Sakuma . |
| 4,756,583 | 7/1988 | Morimoto ................ 359/217 |
| 4,804,981 | 2/1989 | Prakash et al. . |
| 5,025,268 | 6/1991 | Arimoto et al. . |
| 5,189,546 | 2/1993 | Iizuka ................ 359/217 |

*Primary Examiner*—Huan Tran
*Assistant Examiner*—Hai C. Pham

[57] ABSTRACT

In a scanning optical system in which image-surface curvature in the traverse direction is corrected properly without degrading imaging performance in the scanning direction and in which the transverse magnification is approximately uniform irrespective of the deflection angle, the influence of form errors in the imaging lens upon the image is substantially suppressed so as not to degrade the quality of the image. The scanning optical system is provided with a aspherical lens having a refractive power only in the traverse direction and having a TSL shape whose curvature radius increases as the distance in the scanning direction from the center of the lens (the position in which the curvature radius in the traverse direction is smallest) increases. The aspherical lens is disposed in such a way that the line of symmetry that passes through its center is parallel to and at a distance from the optical axis of a first lens unit on the upstream side of a scanning path in the scanning direction. The traverse magnification of the scanning optical system is set at a value in a predetermined range.

37 Claims, 10 Drawing Sheets ic # SCANNING OPTICAL SYSTEM

BACKGROUND OF THE INVENTION

1. Field of the Invention

The present invention relates to a scanning optical system, and more particularly to a scanning optical system that can suitably be used as an image writing means in a printer or digital copier.

2. Description of the Prior Art

As an image writing means for a printer or digital copier, there has conventionally been used a scanning optical system that scans a scanning surface by means of a deflector, which deflects a light beam emitted from a light source, and an imaging lens, which makes the deflected light beam form an image on the scanning surface. In such a scanning optical system, when a polygon mirror is used as the deflector, an inclination error of the reflection surface of the polygon mirror (hereinafter also referred to as "polygon reflection surface") often causes dislocation of one-line images that are formed on the scanning surface (i.e. uneven pitches between the one-line images).

One well-known method of correcting such dislocation is to construct a scanning optical system in which the polygon reflection surface and the scanning surface are arranged to be optically conjugate with each other in the traverse direction (hereinafter, such a construction in the traverse direction of the optical system will be referred to as "surface-inclination-correcting optical system"). Generally, in a scanning optical system that employs a surface-inclination-correcting optical system, a light beam emitted from a light source first forms a linear image extending in the scanning direction near the polygon reflection surface, and thereafter forms a full image on the scanning surface by means of an imaging lens that acts differently in the scanning and traverse directions.

Deflection of the light beam for scanning is achieved by rotation of the polygon mirror. However, as the polygon mirror rotates, the imaging position in the traverse direction of the light beam reflected from the polygon reflection surface varies asymmetrically with respect to the optical axis of the imaging lens. That is, as the polygon mirror rotates, the relative positional relationship between the imaging position in the traverse direction of the light beam and the reflection point at which the light beam is reflected from the polygon reflection surface (i.e. deflection point) varies incessantly, and consequently the imaging position in the traverse direction of the light beam comes in front of the deflection point at some times and behind it at other times. As a result, in the traverse direction, the position of the object point (i.e. object distance) varies incessantly, and accordingly the imaging position in the optical axis direction on or near the scanning surface in the traverse direction (i.e. image-surface curvature in the traverse direction) varies asymmetrically between the upstream and downstream sides of the scanning path in the scanning direction with respect to the optical axis of the imaging lens.

In order to solve such problems, the publication of Japanese Laid-Open Patent Application No. H5-2145 proposes a scanning optical system in which a toric lens having different refractive powers in the scanning and traverse directions is used as the imaging lens, and the toric lens is disposed in such a way that its central axis is at a distance from the optical axis of the other lenses. Moreover, the publication of Japanese Published Patent Application No. H7-69521 proposes a scanning optical system in which the imaging lens has different focal lengths in the scanning and traverse directions, and its focal length in the traverse direction increases monotonically but asymmetrically between its right and left halves as the distance in the scanning direction from the central axis of the imaging lens increases.

Moreover, in a conventional scanning optical system, the magnification in the traverse direction of the optical system (i.e. traverse magnification) varies with the deflection angle on the polygon reflection surface. That is, in a conventional scanning optical system, the traverse magnification is lower for a light beam passing through the periphery of the imaging lens, than for a light beam passing through the center of the imaging lens.

Under the above described condition where the traverse magnification varies with the deflection angle on the polygon reflection surface, the scanning optical system is excessively sensitive to dislocation errors of image points on the scanning surface, called "bows". Here, a "bow" refers to a phenomenon in which a one-line image is formed in an arch-like, curved shape, as when the generatrix of an anamorphic imaging lens is shifted in the traverse direction from the scanning surface expected when there is no surface inclination error on the polygon reflection surface (i.e. when the generatrix of the anamorphic imaging lens does not coincide with the scanning direction), or when there is a surface inclination error on the polygon reflection surface, or when there are both an error in the imaging lens as described above (a shift in the traverse direction) and a surface inclination error. Moreover, it is impossible to obtain a uniform beam diameter in the traverse direction.

One way to solve such problems is to design an imaging lens that allows the traverse magnification of the scanning optical system to be approximately uniform irrespective of the reflection angle on the polygon reflection surface. As an example of such an imaging lens, the specification of U.S. Pat. No. 4,804,981 proposes a scanning optical system in which a TSL (Transformed Saddle Lens) is used in the imaging lens. Here, a TSL refers to a lens which has no refractive power in the scanning direction and has a refractive power only in the traverse direction and which has a surface whose curvature radius increases with the distance in the scanning direction from the center of the lens. When a TSL is used as the anamorphic imaging lens, the traverse magnification of the scanning optical system can be kept approximately uniform irrespective of the deflection angle on the polygon reflection surface. As a result, it is possible to realize a scanning optical system in which bows rarely occur and the beam diameter in the traverse direction is uniform.

Generally, the refractive power in the scanning direction of the imaging lens serves both to cause a light beam to form an image on the scanning surface, and to cause the light beam to be deflected at a uniform angular velocity by the polygon mirror in order to scan the scanning surface at an approximately uniform speed. However, in the above described scanning optical system proposed in the publication of Japanese Laid-Open Patent Application No. H5-2145, since the central axis of the toric lens that has a refractive power also in the scanning direction is positioned at a distance from the optical axes of the other lenses, the imaging performance in the scanning direction is inferior, with image-surface curvature and distortion (fθ characteristic) newly occurring in the scanning direction.

In the above described scanning optical system proposed in the publication of Japanese Published Patent Application No. H7-69521, at high traverse magnifications, it is difficult to sufficiently correct the image-surface curvature in the traverse direction. Furthermore, such a scanning optical system is excessively sensitive to positional and manufacturing errors in the imaging lens. Moreover, since the curvature radius in the scanning direction of the imaging lens is subject to a restriction so that satisfactory performance is secured in the scanning direction, it is not possible to design the scanning optical system freely enough to sufficiently correct the image-surface curvature in the traverse direction.

The above mentioned TSL (U.S. Pat. No. 4,804,981), whose refractive power in the traverse direction varies with the position of incidence in the scanning direction, is difficult to manufacture by directly machining glass or other, because it has a complicated shape. Therefore, it is desirable to manufacture such a lens by molding plastic. A die for molding such a lens from plastic is, as against a die for molding a toric lens, not symmetrical about its central axis. Accordingly, such a die, which cannot be machined on a lathe, needs to be machined on a milling machine. However, since it is generally more difficult to achieve high precision on a milling machine than on a lathe, it is very difficult to manufacture a high-precision lens in that way. This means that the lens inherently includes certain degrees of form errors. If the lens includes large form errors (especially, large form errors in the curvature radii in the traverse direction), the spot diameter on the scanning surface cannot be kept within a design value, and thus the quality of the image is degraded.

SUMMARY OF THE INVENTION

A first object of the present invention is to provide a scanning optical system in which image-surface curvature in the traverse direction can be corrected properly without degrading imaging performance in the scanning direction. A second object of the present invention is to provide a scanning optical system in which the traverse magnification is approximately uniform irrespective of the deflection angle and in which the influence of form errors in the imaging lens upon the image is substantially suppressed so as not to degrade the quality of the image.

To achieve the first object above, according to one aspect of the present invention, a scanning optical system for scanning a scanning surface with a light beam emitted from a light source to form an image thereupon by means of a deflector and an imaging lens comprises a first lens unit included in said imaging lens; and a second lens unit included in said imaging lens and including an aspherical lens having, in a scanning direction in which a light beam is deflected by said deflector, no refractive power and having, in a traverse direction perpendicular to said scanning direction, refractive powers that vary asymmetrically between upstream and downstream sides of a scanning path along the scanning direction with respect to an optical axis direction of said first lens unit.

To achieve the first object above, according to another aspect of the present invention, a scanning optical system for scanning a photosensitive body with a laser beam emitted from a laser source to form an image thereupon by means of a rotating polyhedral mirror and an imaging lens comprises a first anamorphic imaging portion disposed between said laser source and said rotating polyhedral mirror, for forming a laser beam emitted from said laser source into a linear image extending in a scanning direction in which said laser beam is deflected onto a reflection surface of said rotating polyhedral mirror; a second anamorphic imaging portion disposed between said rotating polyhedral mirror and said photosensitive body and including said imaging lens; a first lens unit included in said imaging lens; and a second lens unit included in said imaging lens and including an aspherical lens having, in a scanning direction in which a laser beam is deflected by said rotating polyhedral mirror, no refractive power and having, in a traverse direction perpendicular to said scanning direction, refractive powers that vary asymmetrically between upstream and downstream sides of a scanning path along the scanning direction with respect to an optical axis direction of said first lens unit.

To achieve the second object above, according to still another aspect of the present invention, a scanning optical system for scanning a scanning surface with a light beam emitted from a light source to form an image thereupon by means of a deflector and an imaging lens comprises a first imaging portion disposed between said light source and said deflector; and a second imaging portion disposed between said deflector and said scanning surface and including said imaging lens. Here, a magnification in a traverse direction perpendicular to a scanning direction in which a light beam is deflected by the deflector is approximately uniform for any light beam deflected by said deflector irrespective of a deflection angle, and is within a range defined by the following conditional expression:

$$0.5 \leq \beta s \leq 2.0 \quad (1)$$

where $\beta s$: magnification in the traverse direction of the scanning optical system as a whole.

To achieve the second object above, according to a further aspect of the present invention, a scanning optical system for scanning a photosensitive body with a laser beam emitted from a laser source to form an image thereupon by means of a rotating polyhedral mirror and an imaging lens comprises a first anamorphic imaging portion disposed between said laser source and said rotating polyhedral mirror, for forming a laser beam emitted from said laser source into a linear image extending in a scanning direction in which said laser beam is deflected onto a reflection surface of said rotating polyhedral mirror; and a second anamorphic imaging portion disposed between said rotating polyhedral mirror and said photosensitive body and including said imaging lens. Here, a magnification in a traverse direction perpendicular to a scanning direction in which a laser beam is deflected by the rotating polyhedral mirror is approximately uniform for any laser beam deflected by said rotating polyhedral mirror irrespective of a deflection angle, and is within a range defined by the following conditional expression:

$$0.5 \leq \beta s \leq 2.0 \quad (1)$$

where $\beta s$: magnification in the traverse direction of the scanning optical system as a whole.

Furthermore, according to a still further aspect of the present invention, a method of scanning a scanning surface with a light beam emitted from a light source to form an image thereupon by means of a deflector and an imaging lens comprises the step of disposing between said deflector and said scanning surface an aspherical lens having, in a scanning direction in which a light beam is deflected by said deflector, no refractive power and having, in a traverse direction perpendicular to said scanning direction, refractive powers that vary asymmetrically between upstream and downstream sides of a scanning path along the scanning direction with respect to an optical axis direction of said first lens unit.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Hereinafter, the scanning optical system of the present invention will be described with reference to the drawings.
<<1. Construction of the Scanning Optical System>>

Figure 1:
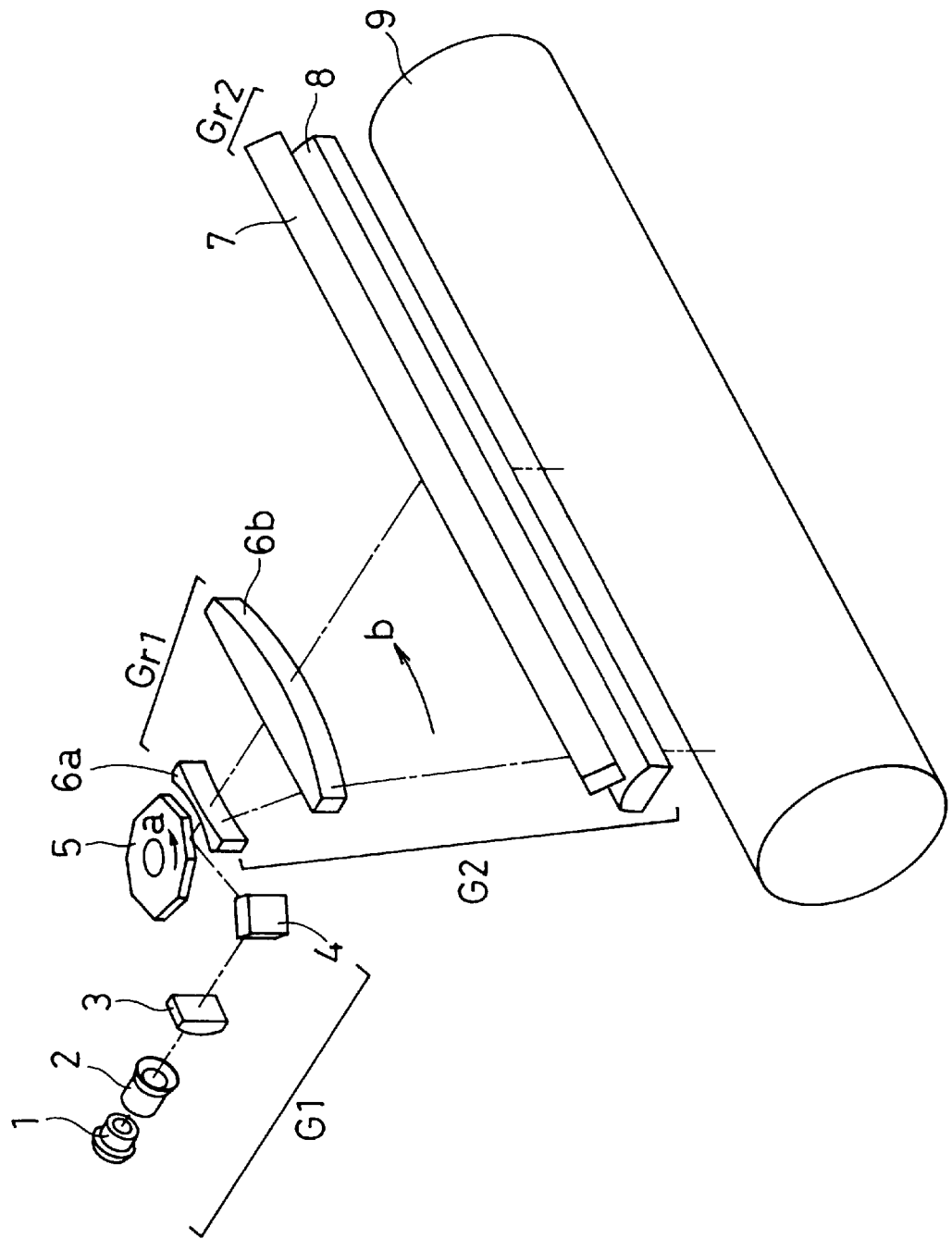
FIG. 1 is a perspective view of the image writing optical system of a printer to which a scanning optical system of the present invention is applied.

FIG. 1 shows an example of image writing optical system of a printer to which a scanning optical system of the present invention is applied. The scanning optical system shown in FIG. 1 comprises, in its outline, a laser diode 1 serving as a light source, a polygon mirror 5 serving as a deflector, a first imaging portion G1 disposed between the laser diode 1 and the polygon mirror 5, and a second imaging portion G2 disposed between the polygon mirror 5 and a photosensitive drum 9 serving as a scanning surface.

The first imaging portion G1 comprises, from the laser diode 1 side, a collimator lens 2 which has positive refractive powers in both scanning and traverse directions and which forms a laser beam emitted from the laser diode 1 into a parallel beam, a first aspherical lens 3 which has a positive refractive power only in the traverse direction and which forms the laser beam into a linear image extending in the scanning direction near the reflection surface of the polygon mirror 5, and a first turning mirror 4. The polygon mirror 5 has the shape of an octagonal prism, and its side surfaces are polished into mirror surfaces to form reflection surfaces. Moreover, the polygon mirror 5 is rotated by a motor (not shown in the figure) in the direction indicated by arrow a (FIG. 1).

The second imaging portion G2 is an anamorphic imaging lens comprising, from the polygon mirror 5 side, a first lens unit Gr1 having a positive refractive power as a whole and a second lens unit Gr2, and makes the laser beam reflected from the polygon reflection surface form an image on the scanning surface. The first lens unit Gr1 is a so-called fθ lens system, and comprises a first spherical lens 6a that is a spherical biconcave lens having a negative refractive power, and a second spherical lens 6b that is a planoconvex lens having a positive refractive power with its spherical convex surface facing to the photosensitive drum 9. The second lens unit Gr2 comprises a second turning mirror 7 that extends along the scanning direction, and a second aspherical lens 8 that is a TSL with its plane surface facing to the photosensitive drum 9 and its convex surface facing to the polygon mirror 5.

Figure 2:
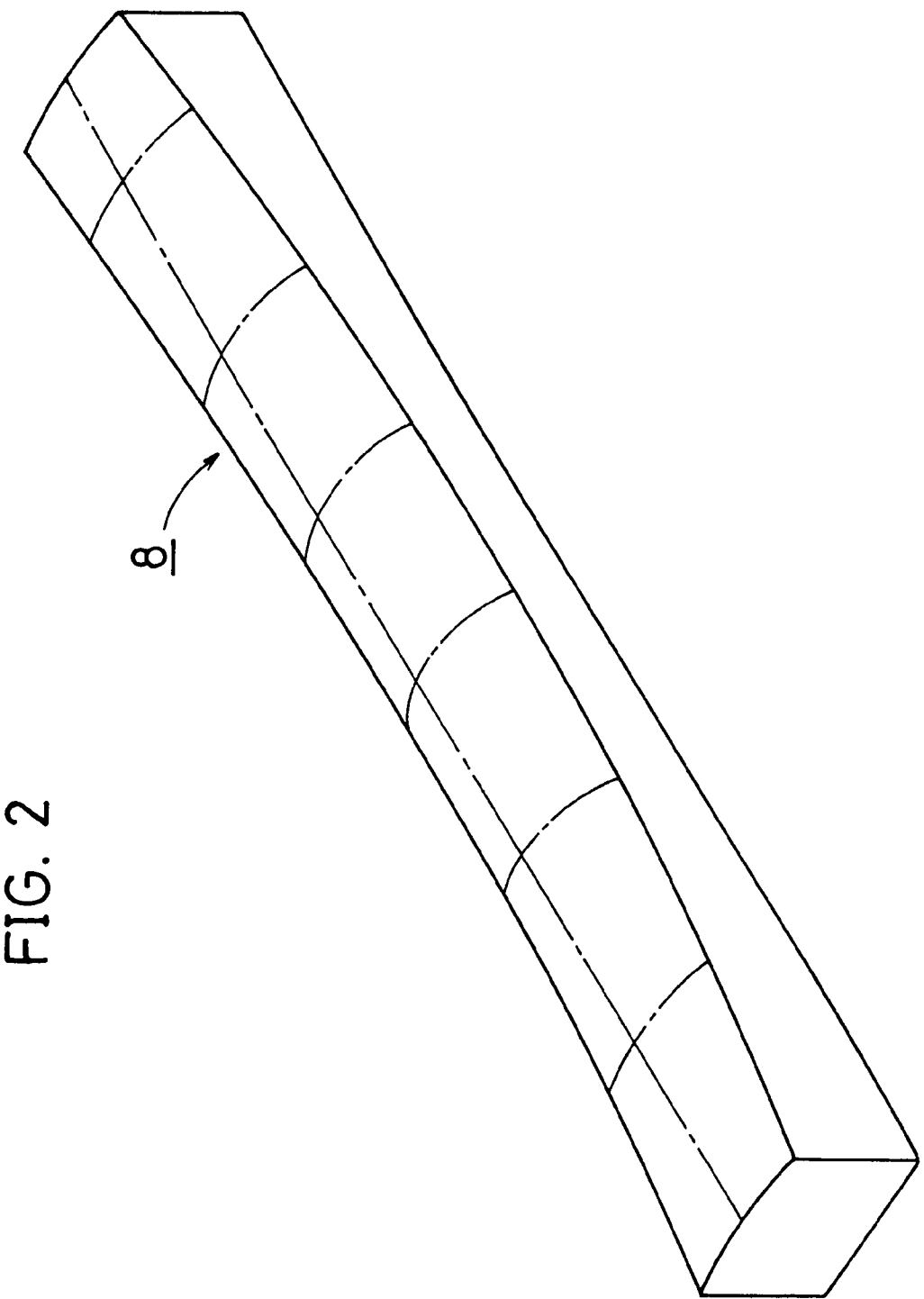
FIG. 2 is a detailed perspective view showing the second aspherical lens composed of a TSL.
Figure 4:
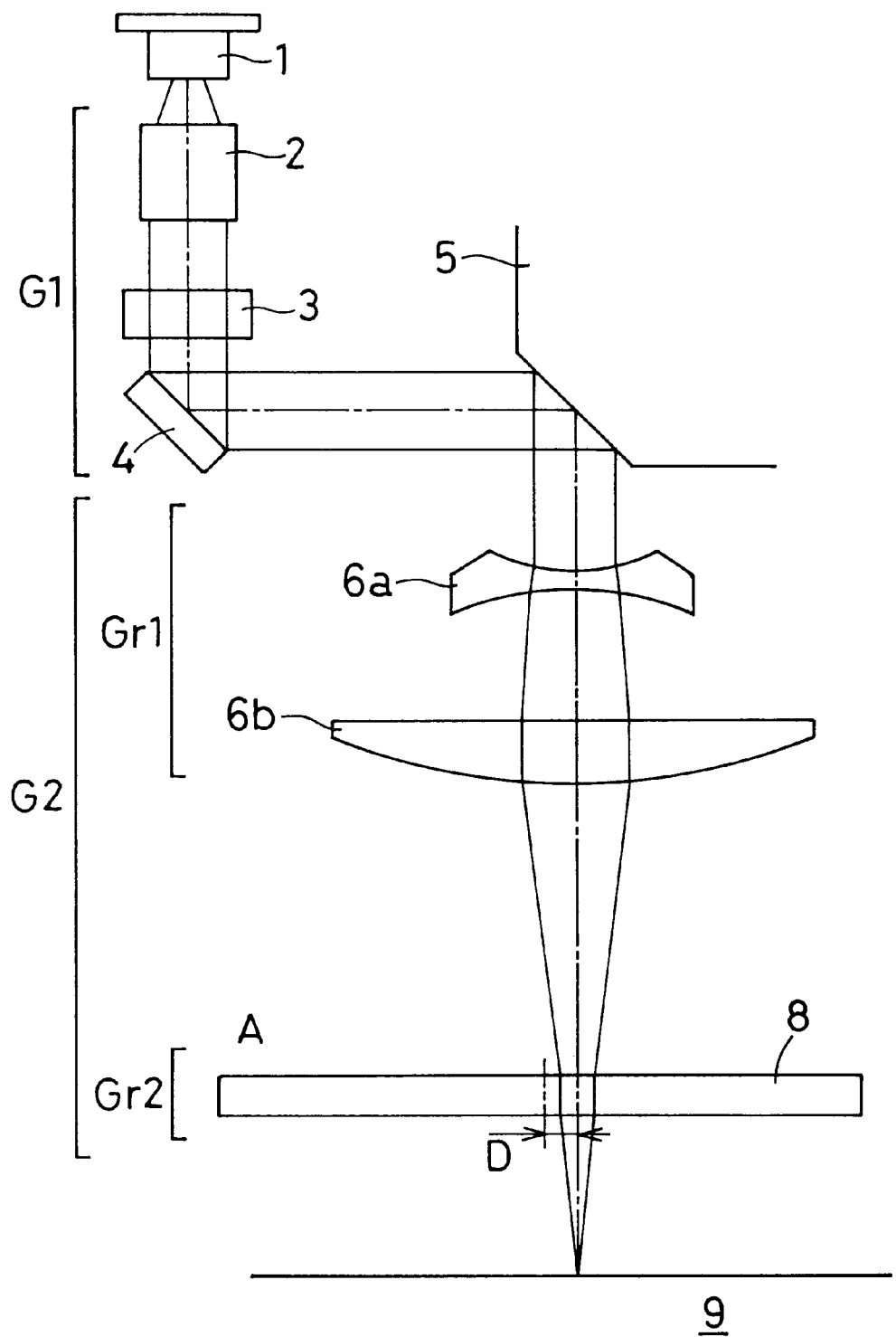
FIG. 4 is a plan view showing the writing optical system of a printer to which a scanning optical system of the present invention is applied.

As described earlier, a TSL is a lens which has no refractive power in the scanning direction and has a refractive power only in the traverse direction and which has a surface whose curvature radius increases as the distance in the scanning direction from the center of the lens increases (FIG. 2). The second aspherical lens 8 is disposed in such a way that the TSL's central axis (for example, the line of symmetry, but not always so, as described later), which is an axis that passes through the TSL at its center where the curvature radius in the traverse direction is smallest (i.e. where the refractive power is greatest), is parallel to and at a predetermined distance (marked D in FIG. 4) from the optical axis of the first lens unit Gr1 on the upstream side of the scanning path in the scanning direction, as shown in FIG. 4.

<<2. Workings of the Scanning Optical System>>

Next, the workings of the scanning optical system of the present invention will be described. A laser beam emitted from the laser diode 1 is formed by the collimator lens 2 into a beam approximately parallel in both scanning and traverse directions, and is then emitted from the collimator lens 2. Thereafter, the laser beam is formed by the first aspherical lens 3 into a beam that is converging only in the traverse direction, is reflected by the first turning mirror 4, and reaches the reflection surface of the polygon mirror 5. Here, the laser beam forms an image in the traverse direction near the polygon reflection surface as a result of the working of the above-mentioned first aspherical lens 3, but remains a parallel beam in the scanning direction. That is, the laser beam is condensed into a linear image extending in the scanning direction. The laser beams is then reflected from the reflection surface of the polygon mirror 5 so as to be deflected for scanning in the direction indicated by arrow b (FIG. 1).

The laser beam reflected from the polygon reflection surface enters the first and second spherical lenses 6a and 6b of the first lens unit Gr1 of the second imaging portion G2. The first lens unit Gr1, which is an fθ lens system, as described above, causes the laser beam incoming at a uniform angular velocity to scan, in the scanning direction, the surface of the photosensitive drum 9 at an approximately uniform speed so that the laser beam forms an image thereupon.

The laser beam exiting from the first lens unit Gr1 is deflected by the second turning mirror 7 toward the photosensitive drum 9, and then enters the second aspherical lens 8. As a result, owing to the composite refractive power of the first and second lens units Gr1 and Gr2, the laser beam forms, in the traverse direction, an image on the photosensitive drum 9. In this way, laser spots are successively formed on the photosensitive drum 9.

<<3. Second Aspherical Lens 8>>

Next, the shape and arrangement of the second aspherical lens 8 will be described below in more detail.

<Shape of the Second Aspherical Lens 8>

In the present invention, as shown in FIG. 2, the second aspherical lens 8 adopts as its shape a TSL shape. Accordingly, its refractive power in the traverse direction decreases as the distance in the scanning direction from the center of the lens (i.e. the position in which its refractive power in the traverse direction is greatest) increases. This makes it possible to correct image-surface curvature in the traverse direction on the photosensitive drum 9.

Moreover, in the present invention, image-surface curvature in the traverse direction is corrected solely by the second aspherical lens 8, whereas aberration in the scanning direction is corrected solely by the first lens unit Gr1. Therefore, adjustment of the scanning optical system can be achieved by adjusting the spot first in the scanning direction with the first lens unit Gr1 and then in the traverse direction with the second aspherical lens 8. As described above, according to the present invention, adjustment of the scanning optical system can be achieved by adjusting the spot in each direction with a separate lens unit, and therefore it is easier, compared with a scanning optical system having a toric surface, to determine the position of each lens unit relative to the optical axis.

Furthermore, since the second aspherical lens 8 is a TSL, the traverse magnification of the scanning optical system is kept approximately uniform irrespective of the deflection angle of the laser beam. Under the condition that the traverse magnification is kept uniform irrespective of the deflection angle of the laser beam, it is possible to keep the spot diameter in the traverse direction uniform irrespective of the deflection angle of the laser beam and, in addition, it is possible to suppress bows as described earlier even if the generatrix of the TSL does not coincide with the scanning direction. As to this aspect, a more detailed description will be given below.

Figure 3A:
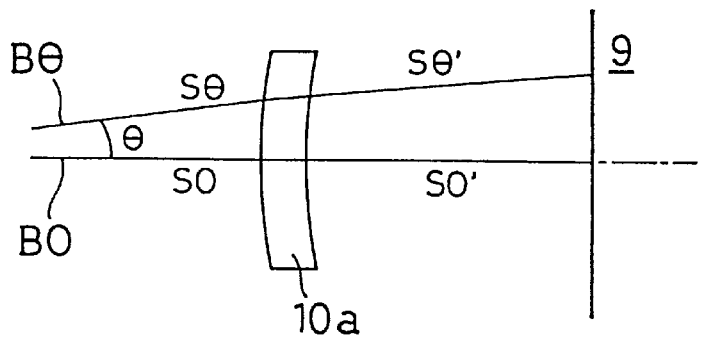
FIGS. 3A and 3B are cross-sectional views along the scanning direction, schematically showing the arrangement of the second imaging portion near the scanning surface to explain the action of the TSL.
Figure 3B:
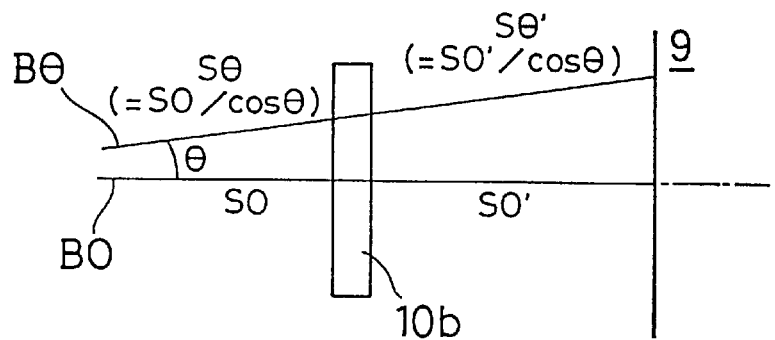

FIGS. 3A and 3B are cross-sectional views along the scanning direction, schematically showing the arrangement of the second imaging portion G2 near the scanning surface (photosensitive drum 9). FIG. 3B shows the second imaging portion G2 of the present invention, and the reference numeral 10b there represents the TSL that corresponds to the second aspherical lens 8. On the other hand, FIG. 3A shows a construction in which a toric lens 10a is used in place of the TSL 10b of FIG. 3B. Note that, since the refractive power that the first lens unit Gr1 has in the traverse direction is far weaker than that of the toric lens 10a or TSL 10b, the refractive power in the traverse direction of the first lens unit Gr1 will be disregarded in the following description.

[FIG. 3A: In the Case Where the Second Imaging Portion G2 Includes a Toric Lens 10a]

As shown in FIG. 3A, suppose that, in the traverse direction of an axial light ray B0 that passes through the toric lens 10a along its central axis, the distance from the object point to the object-side principal point of the toric lens 10a is S0, and the distance from the image-side principal point of the toric lens 10a to the image point is S0'. Then, the traverse magnification β0 of the axial light ray B0 is represented by the following expression (2):

$$\beta 0 = S0/S0' \qquad (2)$$

Similarly, suppose that, in the traverse direction of an off-axial light ray Bθ that is deflected in a direction at an angle θ with respect to the axial light ray B0 that passes through the toric lens 10a along its central axis, the distance from the object point to the object-side principal point of the toric lens 10a is Sθ, and the distance from the image-side principal point of the toric lens 10a to the image point is Sθ'. Then, the traverse magnification βθ of the off-axial light ray Bθ is represented by the following expression (3):

$$\beta \theta = S\theta/S\theta' \qquad (3)$$

In a scanning optical system whose second imaging portion G2 includes a toric lens 10a, the refractive power in the traverse direction of the toric lens 10a is uniform irrespective of the angle of view at which light rays enter the toric lens 10a. Accordingly, in order to allow light rays to form an image on the scanning surface, the value of the expression (3) above naturally varies with the angle of view θ. Therefore, the relationship between β0 and βθ is generally represented by the following expression (4):

$$\beta 0 \neq \beta \theta \qquad (4)$$

This means that, in a conventional scanning optical system that employs a toric lens 10a, the traverse magnification βs varies with the angle of view of light rays. Such a relationship holds even in the case where a common aspherical lens is used in place of the toric lens 10a.

[FIG. 3B: In the Case Where the Second Imaging Portion G2 Includes a TSL 10b]

On the other hand, as shown in FIG. 3B, suppose that, in the traverse direction of an axial light ray B0 that passes through the TSL 10b along its central axis, the distance from the object point to the object-side principal point of the TSL 10b is S0, and the distance from the image-side principal point of the TSL 10b to the image point is S0'. Then, the traverse magnification β0 of the axial light ray B0 is represented by the expression (2) above.

Similarly, suppose that, in the traverse direction of an off-axial light ray Bθ that is deflected in a direction at an angle θ with respect to the axial light ray B0 that passes through the TSL 10b along its central axis, the distance from the object point to the object-side principal point of the TSL 10b is Sθ, and the distance from the image-side principal point of the TSL 10b to the image point is Sθ'. Then, the traverse magnification βθ of the off-axial light ray Bθ is represented by the expression (3) above.

However, since the TSL 10b has no refractive power in the scanning direction, the light ray traveling from the object point to the object-side principal point of the TSL 10b and the light ray traveling from the image-side principal point of the TSL 10*b* to the image point are parallel to each other. Moreover, since the refractive power in the traverse direction of the TSL 10*b* decreases as the distance in the scanning direction from its center (the position in which its curvature radius in the traverse direction is smallest) increases, the TSL 10*b* keeps the object point and the image point conjugate with each other. Therefore, such an optical construction satisfies the following expressions (5) and (6):

$$S\theta = S0/\cos\theta \qquad (5)$$

$$S\theta' = S0'/\cos\theta \qquad (6)$$

Substituting these expressions (5) and (6) in the expression (3) gives the following expression (3)':

$$\beta\theta = (S0/\cos\theta)/(S0'/\cos\theta) \qquad (3)'$$
$$= S0/S0'$$

Accordingly, in a scanning optical system that employs a TSL 10*b*, it is possible to constantly keep the ratio of S0 to S0' approximately uniform, and accordingly the relationship represented by the following expression (4)' holds:

$$\beta 0 = \beta\theta \qquad (4)'$$

As is shown by the expression (4)', in a scanning optical system that employs a TSL 10*b*, the traverse magnification βθ is equal to the traverse magnification β0 irrespective of the deflection angle θ. Accordingly, the traverse magnification βs is approximately uniform for any light beam deflected at any angle θ. As a result, even if the scanning optical system itself includes causes for bows as described earlier, it is possible to substantially suppress bows, and also to obtain a uniform spot diameter on the scanning surface.

<Arrangement of the Second Aspherical Lens 8>

As described earlier, whereas a laser beam forms a linear image extending in the scanning direction near the reflection surface of the polygon mirror 5, the degree of convergence of the light beam reflected from the reflection surface of the polygon mirror 5 varies, as the polygon mirror 5 rotates, asymmetrically with respect to the optical axis of the first lens unit Gr1. That is, as described earlier, since the position of the polygon reflection surface varies incessantly (i.e. the deflection point moves) as the polygon mirror 5 rotates, the imaging position in the traverse direction of the light beam comes in front of the polygon reflection surface at some times and behind it at other times. As a result, image-surface curvature in the traverse direction varies asymmetrically between the upstream and downstream sides of the scanning path in the scanning direction with respect to the optical axis of the first lens unit Gr1. Consequently, laser beams on the upstream side of the scanning path tend to focus too far, whereas laser beams on the downstream side of the scanning path tend to focus too near.

In the scanning optical system of the present invention, as shown in FIG. 4, in order to improve asymmetry of image-surface curvature in the traverse direction as described above, the second aspherical lens 8 is disposed in such a way that its central axis (e.g. the line of symmetry), which passes through it in the position in which its curvature radius is smallest (the position in which its refractive power is greatest), is parallel to and at a distance D from the optical axis of the first lens unit Gr1 on the upstream side (on the side marked A in FIG. 4) of the scanning path in the scanning direction.

In the above described construction, even though, owing to the variation of the deflection point, the position of an object point varies asymmetrically in the optical axis direction as the angle of view of that point varies, the effect of such variation can be canceled by the second aspherical lens 8 because its refractive powers (i.e. curvature radii) in the traverse direction are arranged so as to be asymmetrical between the upstream and downstream sides of the scanning path in the scanning direction with respect to the optical axis of the first lens unit Gr1. Therefore, it is possible to improve asymmetry of image-surface curvature in the traverse direction on the photosensitive drum 9. Moreover, since the second aspherical lens 8 has no refractive power in the scanning direction, even when the central axis of the second aspherical lens 8 is positioned parallel to and at a distance D from the optical axis of the first lens unit Gr1 on the upstream side of the scanning path in the scanning direction, this does not affect, in the scanning direction, aberration characteristics (such as distortion (fθ characteristics)) which is properly corrected by the first and second spherical lenses 6*a* and 6*b*.

As described above, the refractive power in the traverse direction of the second aspherical lens 8 varies asymmetrically between the upstream and downstream sides of the scanning path in the scanning direction with respect to the optical axis of the first lens unit Gr1. However, at the center of the lens 8, where the refractive power in the traverse direction is greatest, the variation of the refractive power may be symmetrical or asymmetrical between the upstream and downstream sides of the scanning path in the scanning direction. If the variation is symmetrical, the central axis of the second aspherical lens 8 is the line of symmetry. In this case, the shape of the TSL is represented by only even-number terms (e.g. a2,2, a2,4, a2,6, . . . ) in the later described expression (A) that represents the arrangement in the scanning direction of the curvature radii in the traverse direction. By contrast, if the variation is asymmetrical, the central axis of the second aspherical lens 8 is not the line of symmetry. In this case, the shape of the TSL is represented by both even-number terms (e.g. a2,2, a2,4, a2,6, . . . ) and odd-number terms (e.g. a2,1, a2,3, a2,5 . . . ) in the later described expression (A) that represents the arrangement in the scanning direction of the curvature radii in the traverse direction.

Under the condition that the central axis of the second aspherical lens 8 is kept coincident with the optical axis of the first lens unit Gr1, even if the variation of the refractive power in the traverse direction is made asymmetrical with respect to the center of the lens 8 where the refractive power in the traverse direction is greatest, there remains image-surface curvature around the central axis. In other words, only by disposing the second aspherical lens 8 in such a way that the point of the second aspherical lens 8 at which its refractive power is greatest is positioned at a distance from the optical axis of the first lens unit Gr1, it is possible to improve asymmetry of the image-surface curvature in the traverse direction all over the scanning surface.

<<4. Range of the Conditional Expression (1)>>

The scanning optical system of the present invention satisfies the following conditional expression (1):

$$0.5 \leq \beta s \leq 2.0 \qquad (1)$$

where

βs: Traverse magnification of the scanning optical system.

The conditional expression (1) defines the traverse magnification βs to be satisfied by the scanning optical system. If the lower limit of the conditional expression (1) is exceeded, the traverse magnification βs is too low, with the result that form errors of the TSL (second aspherical lens 8)

greatly impair the performance of surface inclination correction. Therefore, if the polygon reflection surface includes a surface inclination error, it is impossible to correct the dislocation of one-line images on the scanning surface due to the surface inclination. Furthermore, in such a case, the lens needs to be made inconveniently larger. Reversely, if the upper limit of the conditional expression (1) is exceeded, the traverse magnification βs is too high, with the result that the dislocation of one-line images on the scanning surface due to the surface inclination is enlarged. Furthermore, asymmetrical errors in the movement of the deflection point are enlarged at an accordingly increased magnification. Especially, at traverse magnifications of βs=3 to 5, errors in the positions of object points are enlarged 9 to 25 times, and accordingly it is difficult to suppress image-surface curvature down to zero.

As to the lower and upper limits of the conditional expression (1), a more detailed description will be given below. The lower limit of the conditional expression (1) is determined as follows. As described above, the TSL has a shape that is difficult to form by directly machining glass, and therefore it is desirable to manufacture the TSL by molding plastic. However, a die for molding plastic into a TSL shape can not be machined on a lathe. For this reason, if an attempt is made to manufacture both a die for molding a toric lens and a die for molding plastic into a TSL shape to the same level of precision, the die for molding plastic into a TSL shape will inevitably be more expensive to manufacture. Therefore, in order to reduce the manufacturing cost, it is desirable that the tolerances for form errors in the TSL be as wide as possible. However, if form errors in the TSL (in particular, relatively large errors in the curvature radii in the traverse direction) are tolerated, the surface inclination of the polygon mirror cannot be corrected sufficiently at low traverse magnifications βs.

The above problem will be described in more detail below, with reference to an example of actual lens design. Table 1 shows the effects of an error in the curvature radius upon the scanning optical system, calculated for several traverse magnifications βs. Here, suppose that an error in the curvature radius, resulting from the manufacturing process, has caused the focal length of the TSL at its center to become longer by one percent.

TABLE 1

| βs | f | f' | Δt(400) | Δt(300) |
|---|---|---|---|---|
| 2.0 | 88.89 | 89.78 | 2.0 | 1.5 |
| 1.5 | 96.00 | 96.96 | 2.7 | 2.0 |
| 1.0 | 100.00 | 101.00 | 4.0 | 3.0 |
| 0.75 | 97.96 | 98.94 | 5.4 | 3.6 |
| 0.5 | 88.89 | 89.78 | 8.1 | 6.1 |
| 0.25 | 64.00 | 64.64 | 16.7 | 12.5 |

In Table 1,
f: Nominal focal length of the TSL (mm);
f': Sum of the nominal focal length of the TSL and the one-percent tolerance (mm);
Δt(X): Variation in the distance in the traverse direction between the object point and the image point for the light beam passing through the center of the TSL when the focal length of the TSL varies from f to f', under the condition that the distance between the reflection position on the polygon reflection surface and the image point position on the scanning surface is X mm (mm, here two cases are shown where X=400, 300, respectively).

As seen from Table 1, as the traverse magnification βs becomes lower, the error, resulting from form errors in the TSL, in the distance in the traverse direction between the object and image points becomes greater. For example, under the condition that the distance X between the reflection position on the polygon reflection surface and the image point position on the scanning surface is 400 mm and the traverse magnification βs is 0.25, when the form errors in the TSL cause the focal length to vary by one percent, the distance Δt(400) in the traverse direction between the object and image points varies by as much as 16.7 mm at maximum.

Normally, the TSL is subjected to initial adjustment so that it is disposed with respect to the position in which the image point is formed on the scanning surface. Therefore, an error in the distance in the traverse direction between the object and image points can be represented as an error in the position of the object point. That is, if a TSL having large form errors is used in the scanning optical system, the object point in the traverse direction, with respect to the TSL, moves a distance corresponding to the variation Δt(X) from the polygon reflection surface toward the light source (laser diode 1). Of course, when the focal length of the TSL becomes shorter, the object point moves in the opposite direction, toward the scanning surface (photosensitive drum 9). In other words, if relatively large errors in curvature radii in the traverse direction are tolerated in the TSL, the variation of the position of the object point causes the object point to be at a distance from the polygon reflection surface. Moreover, as the traverse magnification βs becomes lower, the movement amount of the object point becomes larger, and accordingly the distance between the object point and the polygon reflection surface becomes greater.

On the other hand, in a surface-inclination-correcting optical system, the object point should ideally coincide with the polygon reflection surface, because surface inclination is best corrected under that condition. Therefore, when the TSL includes large errors in its curvature radii in the traverse direction, at low traverse magnifications βs, it is not possible to correct the surface inclination of the polygon mirror 5 sufficiently.

Moreover, the above-mentioned movement of the object point position of the TSL needs to be dealt with by adjusting the imaging point of the first aspherical lens 3 disposed closer to the light source than the polygon mirror 5. To conduct such adjustment, the first aspherical lens 3 needs to be moved along the optical axis. However, as described above, as the traverse magnification βs becomes lower, the movement amount of the object point on the TSL becomes larger, and therefore the movement amount by which the first aspherical lens 3 needs to be moved for adjustment inevitably becomes accordingly larger. This necessitates that the distance between the light source (laser diode 1) and the polygon mirror 5 be designed to be longer than necessary in order to secure an adjustment allowance for the first aspherical lens 3, thereby making the scanning optical system larger as a whole.

So far, description has been directed solely to the case where the absolute value of the focal length of the TSL at its center varies. However, if, for example, the ratio of the focal length of the TSL at its center to the focal length at its periphery deviates from a design value, an object point at the center and an object point at the periphery become more distant from each other. Also in such a case, at low traverse magnifications βs, the surface inclination of the polygon mirror cannot be corrected sufficiently at the periphery of the TSL.

The lower limit of the conditional expression (1) is determined in consideration of factors as described above, and therefore it represents the lower limit of the traverse magnification βs that satisfies both the tolerances for form errors in the TSL and the correction performance of the surface-inclination-correcting optical system.

On the other hand, the upper limit of the conditional expression (1) is determined as follows. When the traverse magnification βs is too high, the surface inclination error of the polygon mirror 5 is enlarged. Enlargement of the surface inclination error degrades the imaging performance on the scanning surface. Therefore, it is necessary, in determining the upper limit of the traverse magnification βs, to consider the imaging performance required on the scanning surface.

Suppose that the polygon reflection surface has rotated by an angle Θ about the scanning direction, thereby causing a surface inclination. Then, the amount ΔW of dislocation in the traverse direction of a one-line image (beam wobble amount) is represented by the following expression (7):

$$\Delta W = \Delta P \cdot \beta s \cdot \sin(2 \cdot \Theta) \tag{7}$$

where

ΔP: distance in the traverse direction between the object point and the reflection position on the reflection surface that has moved as a result of the surface inclination.

According to the expression (7) above, the beam wobble amount ΔW increases in proportion to ΔP, βs, and sin (2·Θ). Of these three coefficients, ΔP is a constant that is determined based on Θ and is unique to individual scanning optical systems. Therefore, by determining the maximum permissible value of the beam wobble amount ΔW, the maximum value of βs·sin(2·Θ) is determined for individual scanning optical systems.

Moreover, if the surface inclination amount Θ permissible in the polygon mirror 5 is set at an excessively small value, the polygon mirror 5 needs to have a highly precise shape. This undesirably increases the manufacturing cost of the polygon mirror 5. Therefore, in determining the maximum value of the traverse magnification βs for the permissible beam wobble amount ΔW, it is necessary to consider not only the imaging performance, but also the upper limit of the surface inclination amount Θ that is practically permissible in the polygon mirror 5.

Empirically, the beam wobble amount ΔW is known to remarkably affect the image when it exceeds 10 μm. Considering the above conditions, the inventors of the present invention have concluded that a traverse magnification βs of 2× is suitable as the maximum permissible value in order to tolerate practical form errors in the polygon mirror 5 at the same time as keeping the beam wobble amount ΔW within 10 μm.

As a typical example, in the conditional expression (7) above, let Θ be 120" and ΔP be 2,500 μm. If the maximum value of the traverse magnification βs is 2, the beam wobble value is determined as follows:

$$\Delta W = \Delta P \cdot \beta s \cdot \sin(2 \cdot \Theta)$$
$$= 2{,}500 \times 2 \times \sin(2 \times 120'')$$
$$= 6$$

From the above calculation, the beam wobble amount ΔW is obtained as 6 μm. Here, since ΔW is obviously less than 10 μm, it is known that, even if the polygon mirror 5 includes a surface inclination error at a traverse magnification βs of 2, the surface inclination error does not affect the image.

As described earlier, in the scanning optical system according to Japanese Published Patent Application No. H7-69521, at high traverse magnifications, it is difficult to sufficiently correct the image-surface curvature in the traverse direction. Furthermore, such a scanning optical system is excessively sensitive to positional and manufacturing errors in the imaging lens. Moreover, since the curvature radius in the scanning direction of the imaging lens is subject to a restriction so that satisfactory performance is secured in the scanning direction, it is not possible to design the scanning optical system freely enough to sufficiently correct the image-surface curvature in the traverse direction. Accordingly, the image-surface curvature in the traverse direction needs to be limited to ±2 mm at any rate. In order to limit the image-surface curvature within ±2 mm, it is necessary to limit manufacturing errors down to about 0.1 percent, which is practically difficult to achieve. However, as in the present invention, if the traverse magnification βs is set at a value low enough to satisfy the conditional expression (1), it is possible to reduce the image-surface curvature down to substantially zero, and thus to cope with higher recording densities.

[[Embodiments]]

Hereinafter, the construction data of the second imaging portion G2 of embodiments of the present invention will be presented together with the construction data of the second imaging portion G2 of comparison examples. In the following tables of construction data, Si (i=1, 2, . . . ) represents the i-th surface from the polygon mirror 5 side, ri (i=1, 2, . . . ) represents the curvature radius of the i-th surface Si from the polygon mirror 5 side, r5M represents the curvature radius in the scanning direction of the fifth surface S5 from the polygon mirror 5 side, r5S represents the curvature radius in the traverse direction of the fifth surface S5 from the polygon mirror 5 side (as measured in the position where the curvature radius is greatest), di (i=1, 2, . . . ) represents the axial distance between the i-th surface Si and the (i+1)th surface Si+1 from the polygon mirror 5 side, and Ni (i=1, 2, . . . ) represents the refractive index of the i-th lens from the polygon mirror 5 side for light having a wavelength of 780 nm. Moreover, βs represents the traverse magnification of each embodiment or comparison example, D represents the distance from the optical axis of the first lens unit Gr1 to the central axis that passes through the second aspherical lens 8 at the point where its refractive power is greatest (a positive value represents the upstream side of the scanning path in the scanning direction (the side marked A in FIG. 4)).

Furthermore, in each embodiment or comparison example, the fifth surface S5 from the polygon mirror 5 side (i.e. the shape of the polygon mirror 5 side surface of the second aspherical lens 8, which is a TSL) is defined by the general formula (A) below for an expanded toric surface. Note that the formula (A) presupposes a three-dimensional coordinate space (x: optical axis direction, y: scanning direction, z: traverse direction).

$$X = [\kappa \cdot y^2 / \{1 + (1 - \mu \cdot \kappa^2 \cdot y^2)^{1/2}\}] + \rho + A \tag{A}$$

where $$\kappa = K/(1 - K \cdot \rho) \tag{B}$$

$$\rho = c \cdot z^2 / \{1 + (1 - \epsilon \cdot c^2 \cdot z^2)^{1/2}\} \tag{C}$$

and the term A in the formula (A) is represented by the following formula (D):

$$A = \sum_{i=0}^{16} \left[ \sum_{j=0}^{8} ai, j \cdot |y|^j \right] \cdot |z|^i \tag{D}$$

Note that, in the formula (D),
a0,0≡0

$a_{i,1} = 0$ $a_{1,j} = 0$

An expanded toric surface as defined above is obtained by adding a two-dimensional additional term $A(y, z)$ to a basic z toric surface. Here, suppose that a curve on the scanning-direction cross-section plane is referred to as a principal curve, and a curve on the traverse-direction cross-section plane is referred to as a profile curve. Then, K and c (more precisely, $K+2a_{0,2}$ and $c+2a_{2,0}$) represent the curvature radii at the vertex in the principal-curve direction and profile-curve direction, respectively (in other words, 1/K: the curvature radius of the principal curve at the vertex, 1/c: the curvature radius of the profile curve (the curvature radius in the traverse direction of the principal curve at the vertex)). Moreover, $\mu$ and $\epsilon$ represent the conic-curve parameters (a negative value represents a hyperbola, zero represents a parabola, a positive value represent an ellipse, and a value exactly equal to one represents a circle) in the principal-curve and profile-curve directions, respectively. For each embodiment or comparison example, the above described parameters of the surface S5 are also listed below together with the construction data.

TABLE 2

Construction Data of the Second
Imaging Portion G2 of Embodiment 1

$\beta s = 0.75$
$D = 1.7$

| Surface | Curvature Radius | Axial Distance | Refractive Index |
|---|---|---|---|
| S1 | r1 = −254.4 | d1 = 7 | N1 = 1.51 --- 6a |
| S2 | r2 = 1098.9 | d2 = 30.44 | |
| S3 | r3 = ∞ | d3 = 15 | N2 = 1.82 --- 6b |
| S4 | r4 = −147.5 | d4 = 164 | |
| S5 | r5M = ∞, r5S = 47.75 | d5 = 5 | N3 = 1.52 --- 8 |
| S6 | r6 = ∞ | | |

Parameters of Surface S5
$\epsilon = 1.000$
$\mu = 1.000$
$a_{2,2} = -1.16 \times 10^{-7}$
$a_{2,4} = 1.78 \times 10^{-12}$

TABLE 3

Construction Data of the Second
Imaging Portion G2 of Embodiment 2

$\beta s = 0.50$
$D = 1.3$

| Surface | Curvature Radius | Axial Distance | Refractive Index |
|---|---|---|---|
| S1 | r1 = −254.4 | d1 = 7 | N1 = 1.51 --- 6a |
| S2 | r2 = 1098.9 | d2 = 30.44 | |
| S3 | r3 = ∞ | d3 = 15 | N2 = 1.82 --- 6b |
| S4 | r4 = −147.5 | d4 = 60 | |
| S5 | r5M = ∞, r5S = 54.50 | d5 = 5 | N3 = 1.52 --- 8 |
| S6 | r6 = ∞ | | |

Parameters of Surface S5
$\epsilon = 1.000$
$\mu = 1.000$
$a_{2,2} = -1.06 \times 10^{-7}$
$a_{2,4} = 1.27 \times 10^{-12}$

TABLE 4

Construction Data of the Second
Imaging Portion G2 Embodiment 3

$\beta s = 2.00$
$D = 2.0$

| Surface | Curvature Radius | Axial Distance | Refractive Index |
|---|---|---|---|
| S1 | r1 = −254.4 | d1 = 7 | N1 = 1.51 --- 6a |
| S2 | r2 = 1098.9 | d2 = 30.44 | |
| S3 | r3 = ∞ | d3 = 15 | N2 = 1.82 --- 6b |
| S4 | r4 = −147.5 | d4 = 195 | |
| S5 | r5M = ∞, r5S = 40.60 | d5 = 5 | N3 = 1.52 --- 8 |
| S6 | r6 = ∞ | | |

Parameters of Surface S5
$\epsilon = 1.000$
$\mu = 1.000$
$a_{2,2} = -2.96 \times 10^{-7}$
$a_{2,4} = 9.86 \times 10^{-12}$

TABLE 5

Construction Data of the Second
Imaging Portion G2 of Embodiment 4

$\beta s = 0.50$
Position of Entrance Pupil: 33 mm in front of Surface S1

| Surface | Curvature Radius | Axial Distance | Refractive Index |
|---|---|---|---|
| S1 | r1 = −254.4 | d1 = 7 | N1 = 1.51 --- 6a |
| S2 | r2 = 1098.9 | d2 = 30.44 | |
| S3 | r3 = ∞ | d3 = 15 | N2 = 1.82 --- 6b |
| S4 | r4 = −147.5 | d4 = 195 | |
| S5 | r5M = ∞, r5S = 40.6 | d5 = 5 | N3 = 1.52 --- 8 |
| S6 | r6 = ∞ | | |

Parameters of Surface S5
$\epsilon = 1.000$
$\mu = 1.000$
$a_{2,1} = -1.56478 \times 10^{-7}$
$a_{2,2} = -1.06887 \times 10^{-7}$
$a_{2,3} = -9.08483 \times 10^{-12}$
$a_{2,4} = 1.36547 \times 10^{-12}$
$a_{2,5} = -1.97000 \times 10^{-16}$

TABLE 6

Construction Data of the Second
Imaging Portion G2 of Embodiment 5

$\beta s = 2.00$
Position of Entrance Pupil: 33 mm in front of Surface S1

| Surface | Curvature Radius | Axial Distance | Refractive Index |
|---|---|---|---|
| S1 | r1 = −254.4 | d1 = 7 | N1 = 1.51 --- 6a |
| S2 | r2 = 1098.9 | d2 = 30.44 | |
| S3 | r3 = ∞ | d3 = 15 | N2 = 1.82 --- 6b |
| S4 | r4 = −147.5 | d4 = 60 | |
| S5 | r5M = ∞, r5S = 54.5 | d5 = 5 | N3 = 1.52 --- 8 |
| S6 | r6 = ∞ | | |

Parameters of Surface S5
$\epsilon = 1.000$
$\mu = 1.000$
$a_{2,1} = -7.12553 \times 10^{-7}$
$a_{2,2} = -3.04063 \times 10^{-7}$
$a_{2,3} = -5.19053 \times 10^{-11}$
$a_{2,4} = 1.42551 \times 10^{-11}$
$a_{2,5} = 4.51101 \times 10^{-15}$
$a_{2,6} = -4.99222 \times 10^{-16}$
$a_{2,7} = 1.59286 \times 10^{-19}$

TABLE 7

Construction Data of the Second
Imaging Portion G2 of Embodiment 6

$\beta s = 0.50$
$D = 1.5$
Position of Entrance Pupil: 33 mm in front of Surface S1

| Surface | Curvature Radius | Axial Distance | Refractive Index |
|---|---|---|---|
| S1 | r1 = −254.4 | d1 = 7 | N1 = 1.51 --- 6a |
| S2 | r2 = 1098.9 | d2 = 30.44 | |
| S3 | r3 = ∞ | d3 = 15 | N2 = 1.82 --- 6b |
| S4 | r4 = −147.5 | d4 = 195 | |
| S5 | r5M = ∞, r5S = 40.6 | d5 = 5 | N3 = 1.52 --- 8 |
| S6 | r6 = ∞ | | |

Parameters of Surface S5
$\epsilon = 1.000$
$\mu = 1.000$
$a2, 2 = -1.06 \times 10^{-7}$
$a2, 4 = 1.27 \times 10^{-12}$

TABLE 8

Construction Data of the Second
Imaging Portion G2 of Embodiment 7

$\beta s = 2.00$
$D = 1.5$
Position of Entrance Pupil: 33 mm in front of Surface S1

| Surface | Curvature Radius | Axial Distance | Refractive Index |
|---|---|---|---|
| S1 | r1 = −254.4 | d1 = 7 | N1 = 1.51 --- 6a |
| S2 | r2 = 1098.9 | d2 = 30.44 | |
| S3 | r3 = ∞ | d3 = 15 | N2 = 1.82 --- 6b |
| S4 | r4 = −147.5 | d4 = 60 | |
| S5 | r5M = ∞, r5S = 54.5 | d5 = 5 | N3 = 1.52 --- 8 |
| S6 | r6 = ∞ | | |

Parameters of Surface S5
$\epsilon = 1.000$
$\mu = 1.000$
$a2, 2 = -2.96 \times 10^{-7}$
$a2, 4 = 9.86 \times 10^{-12}$

TABLE 9

Construction Data of the Second Imaging
Portion G2 of Comparison Example 1

$\beta s = 0.75$
$D = 0.0$

| Surface | Curvature Radius | Axial Distance | Refractive Index |
|---|---|---|---|
| S1 | r1 = −254.4 | d1 = 7 | N1 = 1.51 --- 6a |
| S2 | r2 = 1098.9 | d2 = 30.44 | |
| S3 | r3 = ∞ | d3 = 15 | N2 = 1.82 --- 6b |
| S4 | r4 = −147.5 | d4 = 164 | |
| S5 | r5M = ∞, r5S = 47.75 | d5 = 5 | N3 = 1.52 --- 8 |
| S6 | r6 = ∞ | | |

Parameters of Surface S5
$\epsilon = 1.000$
$\mu = 1.000$
$a2, 2 = -1.16 \times 10^{-7}$
$a2, 4 = 1.78 \times 10^{-12}$

TABLE 10

Construction Data of the Second Imaging
Portion G2 of Comparison Example 2

$\beta s = 0.50$
$D = 0.0$
Position of Entrance Pupil: 33 mm in front of Surface S1

| Surface | Curvature Radius | Axial Distance | Refractive Index |
|---|---|---|---|
| S1 | r1 = −254.4 | d1 = 7 | N1 = 1.51 --- 6a |
| S2 | r2 = 1098.9 | d2 = 30.44 | |
| S3 | r3 = ∞ | d3 = 15 | N2 = 1.82 --- 6b |
| S4 | r4 = −147.5 | d4 = 195 | |
| S5 | r5M = ∞, r5S = 40.6 | d5 = 5 | N3 = 1.52 --- 8 |
| S6 | r6 = ∞ | | |

Parameters of Surface S5
$\epsilon = 1.000$
$\mu = 1.000$
$a2, 2 = -1.06 \times 10^{-7}$
$a2, 4 = 1.27 \times 10^{-12}$

TABLE 11

Construction Data of the Second Imaging
Portion G2 of Comparison Example 3

$\beta = 2.00$
$D = 0.0$
Position of Entrance Pupil: 33 min in front of Surface S1

| Surface | Curvature Radius | Axial Distance | Refractive Index |
|---|---|---|---|
| S1 | r1 = −254.4 | d1 = 7 | N1 = 1.51 --- 6a |
| S2 | r2 = 1098.9 | d2 = 30.44 | |
| S3 | r3 = ∞ | d3 = 15 | N2 = 1.82 --- 6b |
| S4 | r4 = −147.5 | d4 = 60 | |
| S5 | r5M = ∞, r5S = 54.5 | d5 = 5 | N3 = 1.52 --- 8 |
| S6 | r6 = ∞ | | |

Parameters of Surface S5
$\epsilon = 1.000$
$\mu = 1.000$
$a2, 2 = -2.96 \times 10^{-7}$
$a2, 4 = 9.86 \times 10^{-12}$ Hereinafter, the aberration data (from the left, ANGLE, DS, DM, IMG Y, DIS) as obtained on the image surface of the first to seventh embodiments of the present invention and of the second and third comparison examples will be presented. In the following tables of aberration data, ANGLE denotes the deflection angle at which light rays are deflected in the scanning direction with respect to the optical axis of the first lens unit Gr1. A positive value there represents the upstream side of the scanning path in the scanning direction (the side marked A in FIG. 4). DS denotes the amount of the image-surface curvature in the traverse direction, and DM denotes the amount of the image-surface curvature in the scanning direction. IMG Y denotes the coordinate value of the image point in the scanning direction with respect to the intersection between the optical axis of the first lens unit Gr1 and the image surface. DIS denotes the distortion.

TABLE 12

Aberration Data of Embodiment 1

$\beta s = 0.75$

| [ANGLE] | [DS] | [DM] | [IMG Y] | [DIS] |
|---|---|---|---|---|
| −30.00 | 0.1516 | 0.4113 | 141.562 | 0.127 |
| −25.00 | 0.0453 | 0.3898 | 118.070 | 0.213 |
| −20.00 | −0.0543 | 0.1370 | 94.439 | 0.195 |

TABLE 12-continued

Aberration Data of Embodiment 1

βs = 0.75

| [ANGLE] | [DS] | [DM] | [IMG Y] | [DIS] |
|---|---|---|---|---|
| −15.00 | −0.1011 | −0.0205 | 70.786 | 0.133 |
| −10.00 | −0.0930 | −0.0572 | 47.159 | 0.066 |
| −5.00 | −0.0481 | −0.0359 | 23.568 | 0.017 |
| 0.00 | 0.0117 | −0.0209 | 0.000 | 0.000 |
| 5.00 | 0.0697 | −0.0417 | −23.568 | 0.017 |
| 10.00 | 0.1175 | −0.0794 | −47.159 | 0.066 |
| 15.00 | 0.1523 | −0.0705 | −70.786 | 0.133 |
| 20.00 | 0.1680 | 0.0688 | −94.439 | 0.194 |
| 25.00 | 0.1399 | 0.3756 | −118.069 | 0.211 |
| 30.00 | 0.0042 | 0.6717 | −141.559 | 0.124 |

TABLE 13

Aberration Data of Embodiment 2

βs = 0.50

| [ANGLE] | [DS] | [DM] | [IMG Y] | [DIS] |
|---|---|---|---|---|
| −30.00 | 0.0735 | 0.4113 | 141.562 | 0.127 |
| −25.00 | −0.0519 | 0.3898 | 118.070 | 0.213 |
| −20.00 | −0.1385 | 0.1370 | 94.439 | 0.195 |
| −15.00 | −0.1770 | −0.0205 | 70.786 | 0.133 |
| −10.00 | −0.1764 | −0.0572 | 47.159 | 0.066 |
| −5.00 | −0.1540 | −0.0359 | 23.568 | 0.017 |
| 0.00 | −0.1263 | −0.0209 | 0.000 | 0.000 |
| 5.00 | −0.1046 | −0.0417 | −23.568 | 0.017 |
| 10.00 | −0.0928 | −0.0794 | −47.159 | 0.066 |
| 15.00 | −0.0888 | −0.0705 | −70.786 | 0.133 |
| 20.00 | −0.0899 | 0.0688 | −94.439 | 0.194 |
| 25.00 | −0.0999 | 0.3756 | −118.069 | 0.211 |
| 30.00 | −0.1391 | 0.6717 | −141.559 | 0.124 |

TABLE 14

Aberration Data of Embodiment 3

βs = 2.00

| [ANGLE] | [DS] | [DM] | [IMG Y] | [DIS] |
|---|---|---|---|---|
| −30.00 | 0.4129 | 0.4113 | 141.562 | 0.127 |
| −25.00 | −0.5107 | 0.3898 | 118.070 | 0.213 |
| −20.00 | −1.0998 | 0.1370 | 94.439 | 0.195 |
| −15.00 | −1.2634 | −0.0205 | 70.786 | 0.133 |
| −10.00 | −1.1130 | −0.0572 | 47.159 | 0.066 |
| −5.00 | −0.8107 | −0.0359 | 23.568 | 0.017 |
| 0.00 | −0.4949 | −0.0209 | 0.000 | 0.000 |
| 5.00 | −0.2463 | −0.0417 | −23.568 | 0.017 |
| 10.00 | −0.0791 | −0.0794 | −47.159 | 0.066 |
| 15.00 | 0.0478 | −0.0705 | −70.786 | 0.133 |
| 20.00 | 0.1963 | 0.0688 | −94.439 | 0.194 |
| 25.00 | 0.3778 | 0.3756 | −118.069 | 0.211 |
| 30.00 | 0.4202 | 0.6717 | −141.559 | 0.124 |

TABLE 15

Aberration Data of Embodiment 4

βs = 0.50

| [ANGLE] | [DS] | [DM] | [IMG Y] | [DIS] |
|---|---|---|---|---|
| −29.66 | −0.0206 | 0.3111 | −139.965 | 0.1544 |
| −23.405 | 0.0106 | 0.2699 | −110.527 | 0.2262 |
| −17.15 | −0.0033 | 0.0525 | −80.9418 | 0.1683 |
| −10.895 | −0.0091 | 0.0091 | −51.375 | 0.0797 |
| −4.64 | −0.0037 | 0.0577 | −21.8656 | 0.015 |
| 1.615 | 0.0007 | 0.0729 | 7.6095 | 0.0012 |
| 7.87 | −0.0024 | 0.0157 | 37.0972 | 0.0432 |

TABLE 15-continued

Aberration Data of Embodiment 4

βs = 0.50

| [ANGLE] | [DS] | [DM] | [IMG Y] | [DIS] |
|---|---|---|---|---|
| 14.125 | −0.0072 | −0.035 | 66.6362 | 0.1252 |
| 20.38 | −0.0022 | 0.0778 | 96.223 | 0.2066 |
| 26.635 | 0.0093 | 0.4174 | 125.7631 | 0.2126 |
| 32.89 | −0.0178 | 0.3962 | 154.9844 | 0.0105 |

TABLE 16

Aberration Data of Embodiment 5

βs = 2.00

| [ANGLE] | [DS] | [DM] | [IMG Y] | [DIS] |
|---|---|---|---|---|
| −29.66 | −0.0206 | 0.3111 | −139.965 | 0.1544 |
| −23.405 | 0.0106 | 0.2699 | −110.527 | 0.2262 |
| −17.15 | −0.0033 | 0.0525 | −80.9418 | 0.1683 |
| −10.895 | −0.0091 | 0.0091 | −51.375 | 0.0797 |
| −4.64 | −0.0037 | 0.0577 | −21.8656 | 0.015 |
| 1.615 | 0.0007 | 0.0729 | 7.6095 | 0.0012 |
| 7.87 | −0.0024 | 0.0157 | 37.0972 | 0.0432 |
| 14.125 | −0.0072 | −0.035 | 66.6362 | 0.1252 |
| 20.38 | −0.0022 | 0.0778 | 96.223 | 0.2066 |
| 26.635 | 0.0093 | 0.4174 | 125.7631 | 0.2126 |
| 32.89 | −0.0178 | 0.3962 | 154.9844 | 0.0105 |

TABLE 17

Aberration Data of Embodiment 6

βs = 0.50
D = 1.5

| [ANGLE] | [DS] | [DM] | [IMG Y] | [DIS] |
|---|---|---|---|---|
| −29.66 | 0.105 | 0.3111 | −139.965 | 0.1544 |
| −23.405 | −0.0257 | 0.2699 | −110.527 | 0.2262 |
| −17.15 | −0.0852 | 0.0525 | −80.9418 | 0.1683 |
| −10.895 | −0.0765 | 0.0091 | −51.375 | 0.0797 |
| −4.64 | −0.0322 | 0.0577 | −21.8656 | 0.015 |
| 1.615 | 0.0134 | 0.0729 | 7.6095 | 0.0012 |
| 7.87 | 0.0406 | 0.0157 | 37.0972 | 0.0432 |
| 14.125 | 0.0476 | −0.035 | 66.6362 | 0.1252 |
| 20.38 | 0.0411 | 0.0778 | 96.223 | 0.2066 |
| 26.635 | 0.0151 | 0.4174 | 125.7631 | 0.2126 |
| 32.89 | −0.0772 | 0.3962 | 154.9844 | 0.0105 |

TABLE 18

Aberration Data of Embodiment 7

βs = 2.00
D = 1.5

| [ANGLE] | [DS] | [DM] | [IMG Y] | [DIS] |
|---|---|---|---|---|
| −29.66 | 1.3685 | 0.3111 | −139.965 | 0.1544 |
| −23.405 | 0.2628 | 0.2699 | −110.527 | 0.2262 |
| −17.15 | −0.299 | 0.0525 | −80.9418 | 0.1683 |
| −10.895 | −0.3278 | 0.0091 | −51.375 | 0.0797 |
| −4.64 | −0.122 | 0.0577 | −21.8656 | 0.015 |
| 1.615 | 0.0464 | 0.0729 | 7.6095 | 0.0012 |
| 7.87 | 0.0508 | 0.0157 | 37.0972 | 0.0432 |
| 14.125 | −0.0703 | −0.035 | 66.6362 | 0.1252 |
| 20.38 | −0.1795 | 0.0778 | 96.223 | 0.2066 |
| 26.635 | −0.2238 | 0.4174 | 125.7631 | 0.2126 |
| 32.89 | −0.6456 | 0.3962 | 154.9844 | 0.0105 |

TABLE 19

Aberration Data of Comparison Example 2

βs = 0.50
D = 0.0

| [ANGLE] | [DS] | [DM] | [IMG Y] | [DIS] |
|---|---|---|---|---|
| −29.66 | 0.5158 | 0.3111 | −139.965 | 0.1544 |
| −23.405 | 0.2415 | 0.2699 | −110.527 | 0.2262 |
| −17.15 | 0.0971 | 0.0525 | −80.9418 | 0.1683 |
| −10.895 | 0.0414 | 0.0091 | −51.375 | 0.0797 |
| −4.64 | 0.0203 | 0.0577 | −21.8656 | 0.015 |
| 1.615 | −0.0099 | 0.0729 | 7.6095 | 0.0012 |
| 7.87 | −0.0677 | 0.0157 | 37.0972 | 0.0432 |
| 14.125 | −0.1433 | −0.035 | 66.6362 | 0.1252 |
| 20.38 | −0.2057 | 0.0778 | 96.223 | 0.2066 |
| 26.635 | −0.22 | 0.4174 | 125.7631 | 0.2126 |
| 32.89 | −0.171 | 0.3962 | 154.9844 | 0.0105 |

TABLE 20

Aberration Data of Comparison Example 3

βs = 2.00
D = 0.0

| [ANGLE] | [DS] | [DM] | [IMG Y] | [DIS] |
|---|---|---|---|---|
| −29.66 | 4.9826 | 0.3111 | −139.965 | 0.1544 |
| −23.405 | 2.6485 | 0.2699 | −110.527 | 0.2262 |
| −17.15 | 1.3408 | 0.0525 | −80.9418 | 0.1683 |
| −10.895 | 0.7178 | 0.0091 | −51.375 | 0.0797 |
| −4.64 | 0.3246 | 0.0577 | −21.8656 | 0.015 |
| 1.615 | −0.1684 | 0.0729 | 7.6095 | 0.0012 |
| 7.87 | −0.8774 | 0.0157 | 37.0972 | 0.0432 |
| 14.125 | −1.6908 | −0.035 | 66.6362 | 0.1252 |
| 20.38 | −2.3146 | 0.0778 | 96.223 | 0.2066 |
| 26.635 | −2.3963 | 0.4174 | 125.7631 | 0.2126 |
| 32.89 | −1.8044 | 0.3962 | 154.9844 | 0.0105 |

In each embodiment or comparison example, the second aspherical lens 8 is a plastic lens made of amorphous polyolefin. Use of a material such as amorphous polyolefin makes it possible to manufacture the second aspherical lens 8, which has a laterally extended shape and an aspherical surface, inexpensively by, for example, resin molding.

Figure 5:
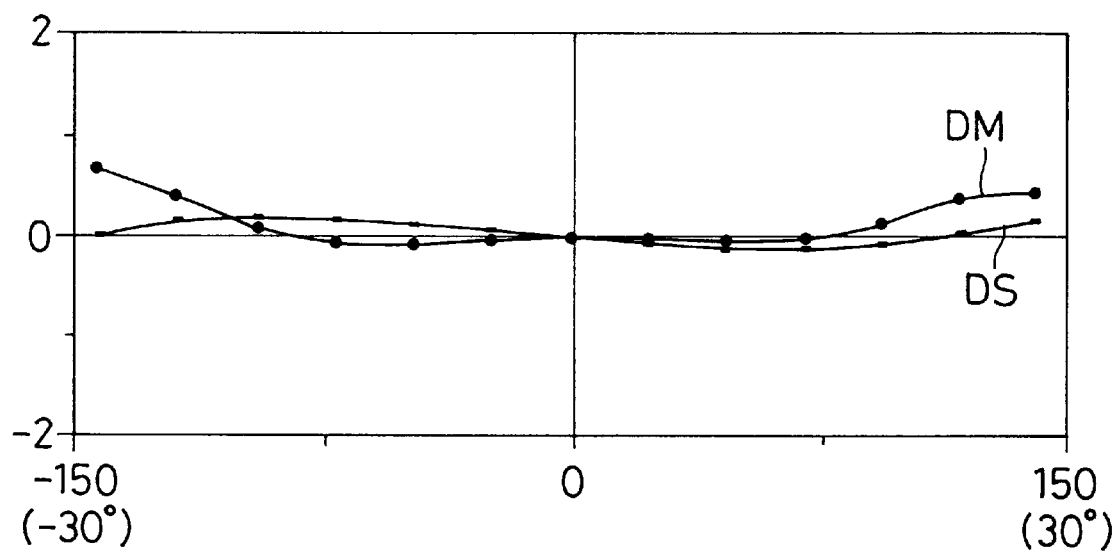
FIG. 5 is an aberration diagram showing the image-surface curvature of a scanning optical system of the first embodiment of the present invention.
Figure 6:
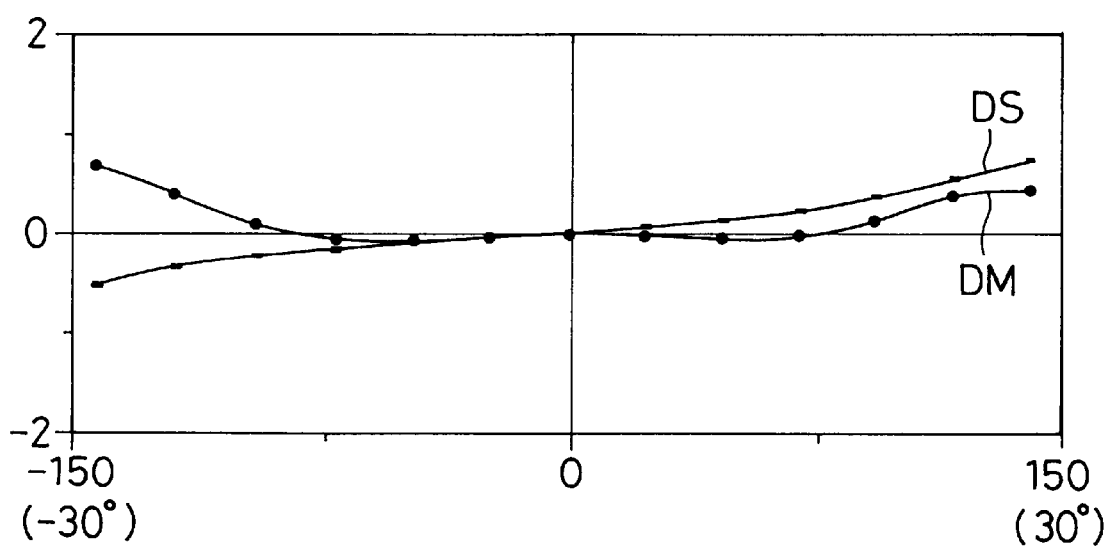
FIG. 6 is an aberration diagram showing the image-surface curvature of a scanning optical system of the first comparison example.

FIG. 5 is an aberration diagram showing the image-surface curvature DM and DS of the scanning optical system of the first embodiment. FIG. 6 is an aberration diagram showing the image-surface curvature DM and DS of the scanning optical system of the first comparison example. In each aberration diagram, DM represents the image-surface curvature in the scanning direction, and DS represents the image-surface curvature in the traverse direction. In the first embodiment, the second aspherical lens 8 is decentered relative to the first lens unit Gr1. That is, the second aspherical lens 8 is disposed in such a way that the position in which its refractive power is greatest is at a distance from the optical axis of the first lens unit Gr1. By contrast, in the first comparison example, the second aspherical lens 8 is disposed in such a way that it is coaxial with the first lens unit Gr1 (i.e. D=0.0). In other respects, the first embodiment and the first comparison example have the same construction.

In FIGS. 5 and 6, the transverse axis represents the distance on the scanning surface (photosensitive drum 9) between a light ray and the optical axis of the first lens unit (unit: mm) under the condition that the light ray is deflected±30° about the optical axis of the first lens unit Gr1. A positive value there represents the upstream side of the scanning path in the scanning direction (the side marked A in FIG. 4). On the other hand, the longitudinal axis represents the amount of dislocation in the optical axis direction of the focal point from the scanning surface (image-surface curvature, unit: mm). A negative value there represents the polygon mirror 5 side of the scanning surface. Moreover, in FIGS. 5 and 6, DM and DS correspond to the focal point (image-surface curvature) in the scanning direction and the traverse direction, respectively.

As against the first embodiment in which the second aspherical lens 8 is disposed in such a way that its central axis (the line of symmetry through the center of the second aspherical lens 8) is at a distance D from the optical axis of the first lens unit Gr1, in the comparison example 1, the second aspherical lens 8 is disposed in such a way that its central axis (the line of symmetry that passes through the center of the second aspherical lens 8) coincides with the optical axis of the first lens unit Gr1. This difference in arrangement results in the difference between the image-surface curvature shown in FIG. 5 and that shown in FIG. 6. Specifically, as seen from FIGS. 5 and 6, by disposing the second aspherical lens 8 in such a way that the line of symmetry through the center of the second aspherical lens 8 is at a distance D from the optical axis of the first lens unit Gr1, the image-surface curvature in the traverse direction is improved in terms of its absolute value and degree of symmetry. On the other hand, the image-surface curvature in the scanning direction is not at all affected by this.

Figure 7:
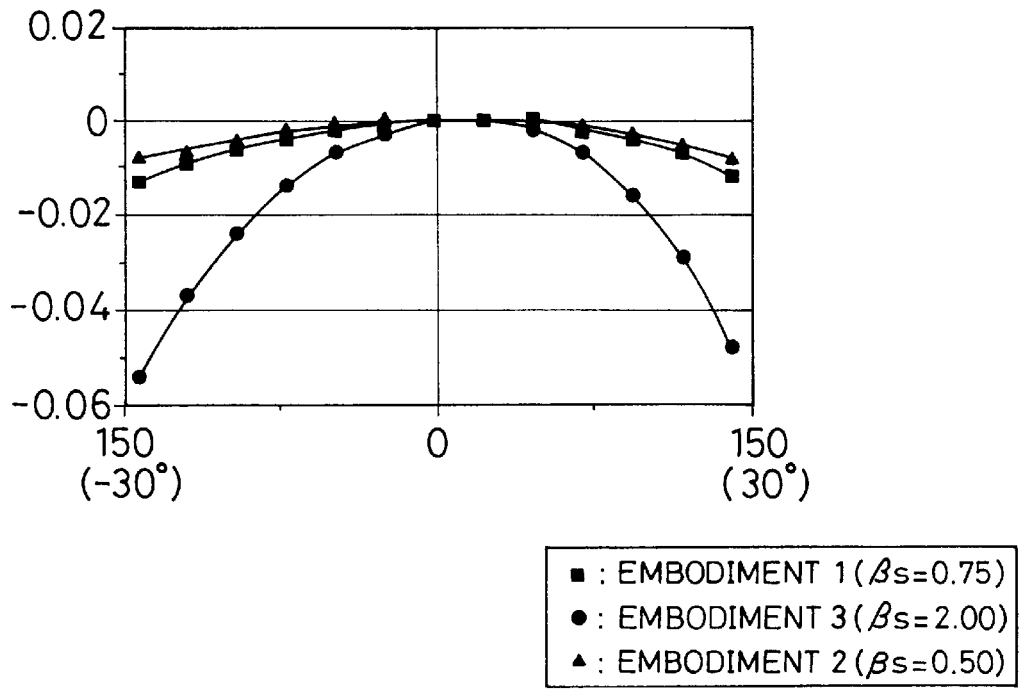
FIG. 7 is a diagram showing movement amounts of the image point in the traverse direction in scanning optical systems of the first to third embodiments of the present invention.
Figure 8:
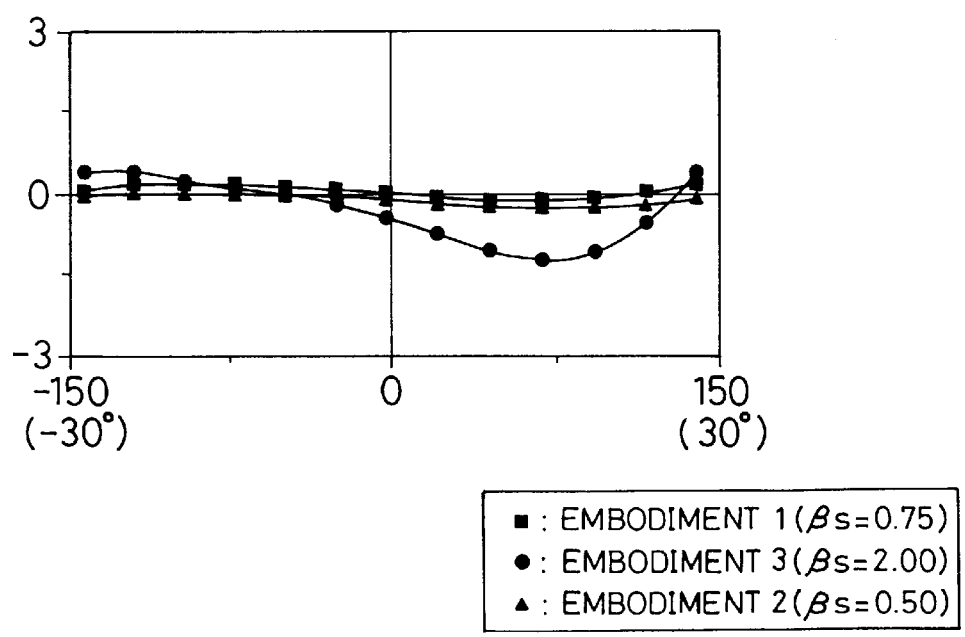
FIG. 8 is an aberration diagram showing the image-surface curvature in the traverse direction in scanning optical systems of the first to third embodiments.

FIG. 7 is a diagram showing the amount of the movement (bow) in the traverse direction of the image point on the scanning surface when the generatrix of the second aspherical lens 8 is shifted 0.5 mm in the traverse direction (the same condition as when there is a surface inclination error of 0.1° in the polygon mirror 5) in the scanning optical systems of the first to third embodiments. FIG. 8 is an aberration diagram showing the image-surface curvature in the traverse direction DS in the scanning optical systems of the first to third embodiments. In FIG. 7, the transverse axis is the same as in FIGS. 5 and 6, and the longitudinal axis represents the amount of the above-mentioned bow (unit: mm) with respect to the image point position when there is no bow. A negative value represents the polygon mirror 5 side of the scanning surface. In FIG. 8, the transverse and longitudinal axes are the same as in FIGS. 5 and 6.

Figure 9:
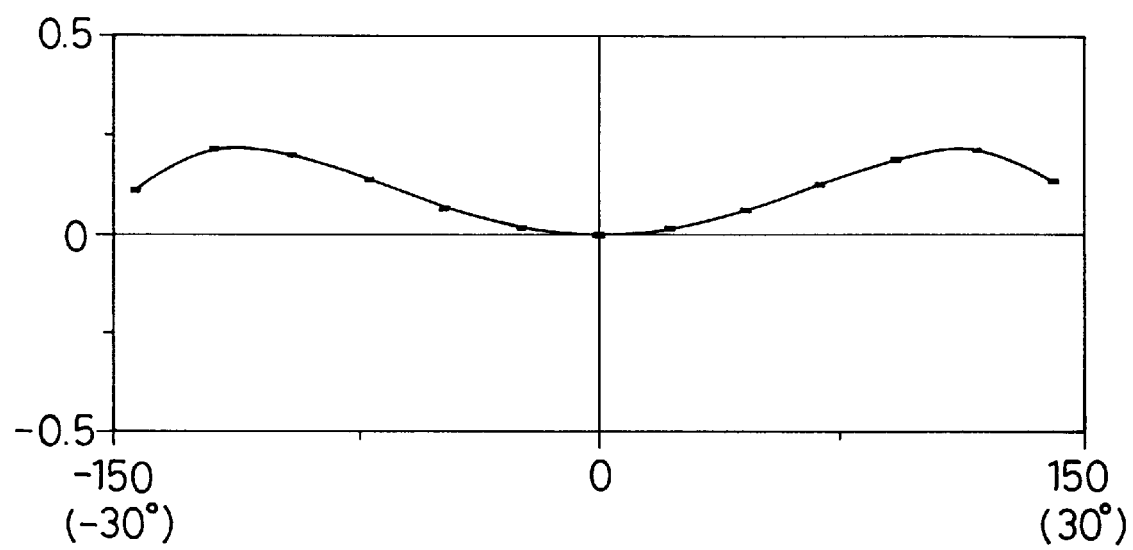
FIG. 9 is an aberration diagram showing the distortion in scanning systems of the first to third embodiments.

FIG. 9 is an aberration diagram showing the distortion (fθ characteristic) DIS in the scanning optical systems of the first to third embodiments. In FIG. 9, the transverse axis is the same as in FIGS. 5 to 8, and the longitudinal axis represents the amount of the distortion (unit: percent). In the scanning optical systems of the first to the third embodiments, since the second aspherical lens 8 has no refractive power in the scanning direction, even if the second aspherical lens 8 is moved in the scanning direction, or even if the shape of the aspherical surface varies, the fθ characteristic in the scanning direction is not affected. Therefore, even if the second aspherical lens 8 is disposed in such a way that the line of symmetry through the center of the second aspherical lens 8 is at a distance D from the optical axis of the first lens unit Gr1, the diagram of FIG. 9 remains unchanged, that is, the distortion in the first to third embodiments remains the same (therefore, the aberration diagram of FIG. 9 is common to all the above cases).

Figure 10:
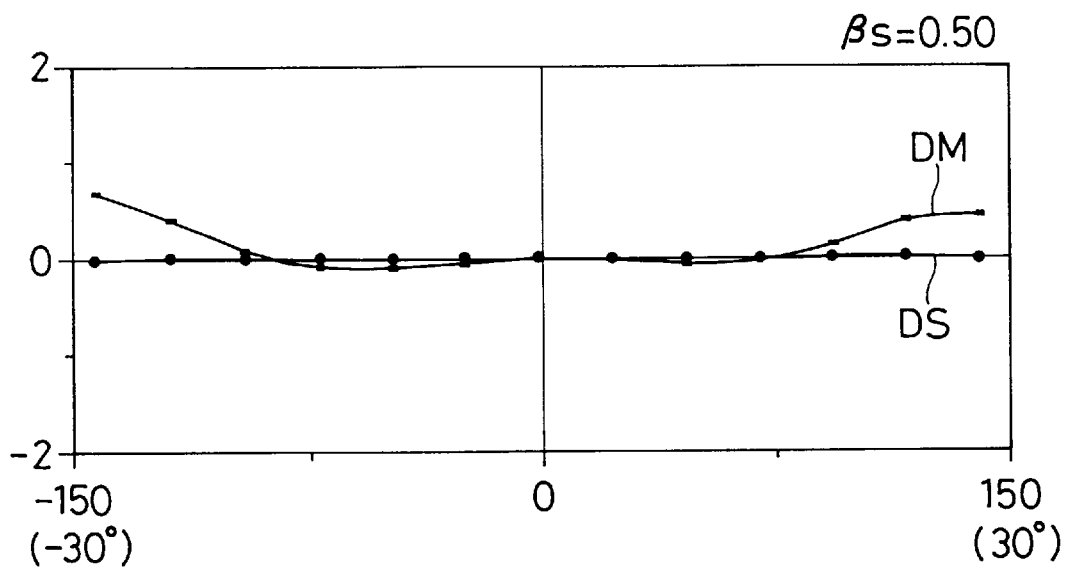
FIG. 10 is an aberration diagram showing the image-surface curvature in a scanning optical system of the fourth embodiment of the present invention.
Figure 11:
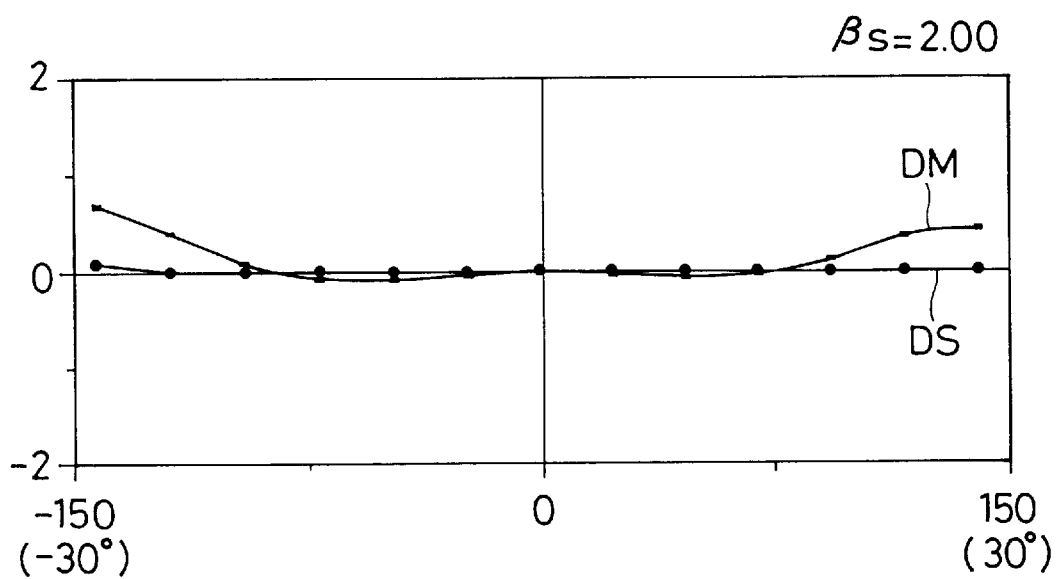
FIG. 11 is an aberration diagram showing the image-surface curvature in a scanning optical system of the fifth embodiment of the present invention.

FIG. 10 is an aberration diagram showing the image-surface curvature in the scanning and traverse directions, DM and DS respectively, in the scanning optical system of the fourth embodiment. FIG. 11 is an aberration diagram showing the image-surface curvature in the scanning and traverse directions DM and DS, respectively, in the scanning optical system of the fifth embodiment. In FIGS. 10 and 11, the transverse and longitudinal axes are the same as in FIGS. 5 and 6.

Figure 12:
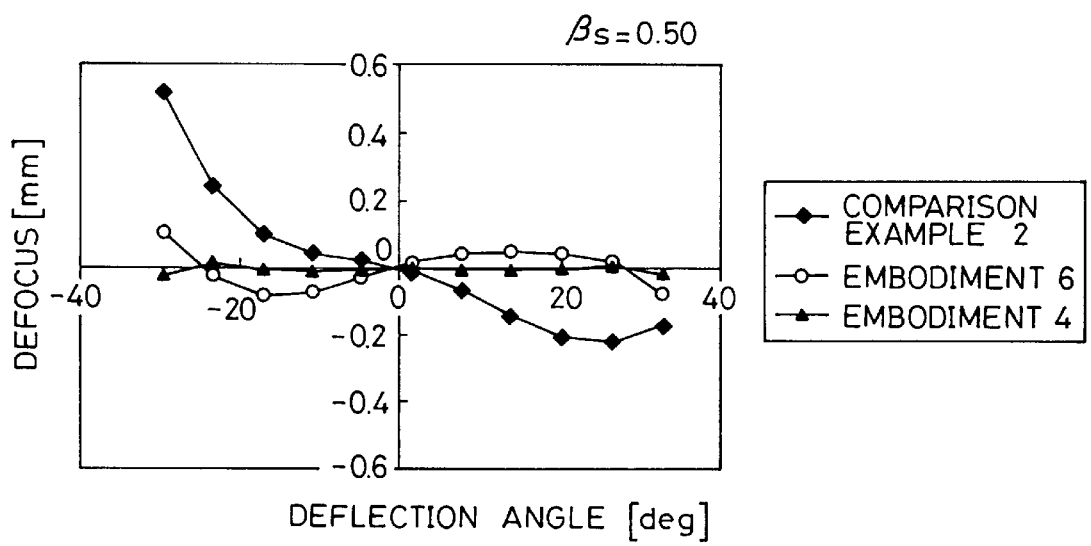
FIG. 12 is an aberration diagram showing the image-surface curvature in the traverse direction in scanning optical systems of the fourth and sixth embodiments of the present invention and of the second comparison example.
Figure 13:
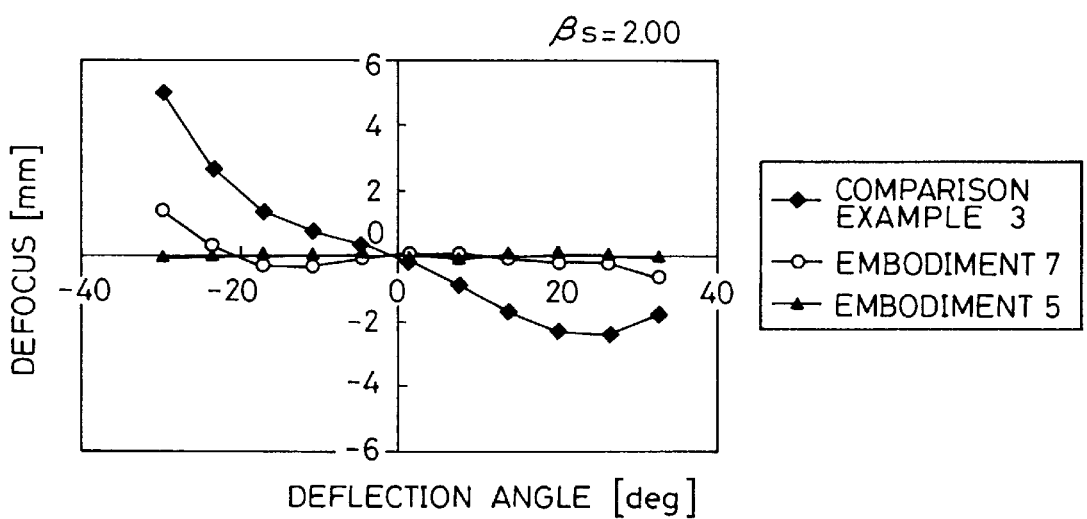
FIG. 13 is an aberration diagram showing the image-surface curvature in the traverse direction in scanning optical systems of the fifth and seventh embodiments of the present invention and of the third comparison example.

FIG. 12 is an aberration diagram showing the image-surface curvature in the traverse direction DS in the fourth and sixth embodiments and in the second comparison example. FIG. 13 is an aberration diagram showing the image-surface curvature in the traverse direction DS in the fifth and seventh embodiments and in the third comparison example. In FIGS. 12 and 13, the transverse axis represents the distance on the scanning surface (photosensitive drum 9) between a light ray and the optical axis of the first lens unit (unit: mm) under the condition that the light ray is deflected±40° about the optical axis of the first lens unit Gr1. A positive value there represents the upstream side of the scanning path in the scanning direction (the side marked A in FIG. 4). On the other hand, the longitudinal axis represents the amount of dislocation in the optical axis direction of the focal point from the scanning surface (image-surface curvature, unit: mm). A negative value there represents the polygon mirror 5 side of the scanning surface.

Figure 14:
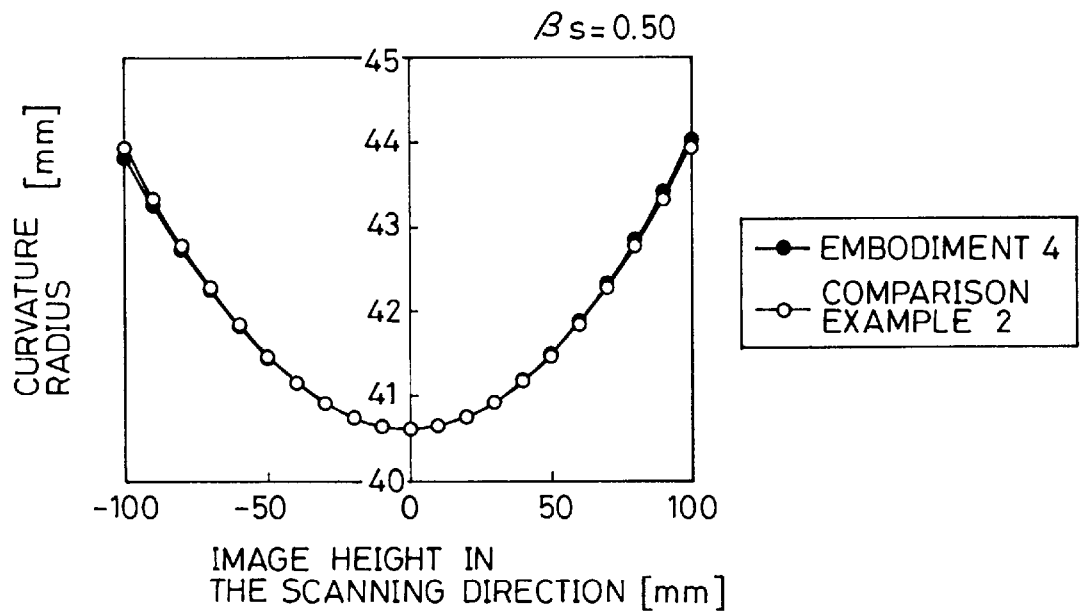
FIG. 14 is a diagram showing the variation, in the scanning direction, of the curvature radius, in the traverse direction, of the TSL employed in the fourth embodiment and in the second comparison example.
Figure 15:
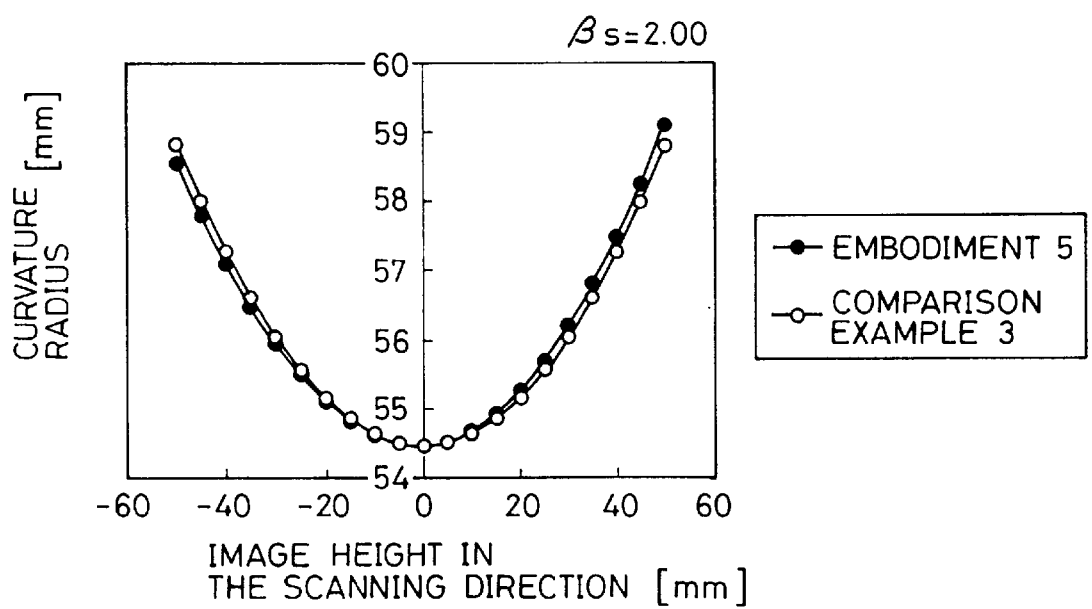
FIG. 15 is a diagram showing the variation, in the scanning direction, of the curvature radius, in the traverse direction, of the TSL employed in the fifth embodiment and in the third comparison example.

FIG. 14 is a diagram showing the variation in the scanning direction of the curvature radius in the traverse direction of the TSL employed in the fourth embodiment and in the second comparison example. FIG. 15 is a diagram showing the variation in the scanning direction of the curvature radius in the traverse direction of the TSL employed in the fifth embodiment and in the third comparison example. In FIGS. 14 and 15, the longitudinal axis represents the curvature radius in the traverse direction, and the transverse axis represents the distance on the scanning surface (photosensitive drum 9) from the optical axis of the first lens unit Gr1 (the image height in the scanning direction, unit: mm). A positive value there represents the upstream side of the scanning path in the scanning direction (the side marked A in FIG. 4).

As described above, according to one aspect of the present invention, since correction of the image-surface curvature in the traverse direction does not affect the imaging performance in the scanning direction, it is possible to properly correct the image-surface curvature in the traverse direction without degrading the imaging performance in the scanning direction. Accordingly, by applying the scanning optical system of the present invention to image writing means for devices such as printers and digital copiers, it is possible to improve the quality of images produced by such devices. Moreover, it is also possible to remove defects associated with the above-mentioned toric lens, and thus it is possible to correct the asymmetry of the image-surface curvature in the traverse direction and to sufficiently suppress the amount of that image-surface curvature, without degrading the fθ characteristic or increasing the image-surface curvature in the scanning direction at all. For example, even when a surface-inclination-correcting optical system is adopted, it is possible to make the image-surface curvature in the traverse direction symmetrical with respect to the optical axis, and also to reduce the amount of the image-surface curvature, without affecting the imaging performance in the scanning direction at all.

According to another aspect of the present invention, in a scanning optical system in which the traverse magnification is approximately uniform irrespective of the deflection angle, the traverse magnification is so determined that form errors in the imaging lens are tolerated without significantly degrading the image quality. As a result, it is possible to obtain satisfactory imaging performance without excessively increasing the manufacturing cost of the imaging lens. Moreover, it is possible to reduce the adjustment allowance that is required for adjusting the image point of the imaging lens, and thus to make the scanning optical system compact as a whole. Accordingly, by applying the scanning optical system of the present invention to image writing means for devices such as printers and digital copiers, it is possible to improve the quality of images produced by such devices.

What is claimed is:

1. A scanning optical system for scanning a scanning surface with a light beam emitted from a light source to form an image thereupon by means of a deflector and an imaging lens, comprising:

a first lens unit included in said imaging lens; and a second lens unit included in said imaging lens and including an aspherical lens having, in a scanning direction in which the light beam is deflected by said deflector, no refractive power and having, in a traverse direction perpendicular to said scanning direction, refractive powers that vary asymmetrically between upstream and downstream sides of a scanning path along the scanning direction with respect to an optical axis direction of said first lens unit, wherein a magnification in the traverse direction perpendicular to the scanning direction in which the light beam is deflected by the deflector is approximately constant for both axial rays and off-axial rays in the scanning direction for any light beam deflected by said deflector irrespective of a deflection angle, and is within a range defined by a conditional expression:

$$0.5 \leq \beta s \leq 2.0$$

where

βs: magnification in the traverse direction of the scanning optical system as a whole.

2. A scanning optical system as claimed in claim 1, wherein the aspherical lens included in said second lens unit is so formed that said refractive power of said aspherical lens in the traverse direction decreases with a distance in the scanning direction from a position in which the refractive power in the traverse direction is greatest.

3. A scanning optical system as claimed in claim 1, wherein the aspherical lens included in said second lens unit is disposed in such a way that a position in which said refractive power of said aspherical lens in the traverse direction is greatest, is at a distance from an optical axis of said first lens unit.

4. A scanning optical system as claimed in claim 1, wherein the aspherical lens included in said second lens unit is so formed that said refractive power of said aspherical lens in the traverse direction decreases with a distance in the scanning direction from a position in which the refractive power in the traverse direction is greatest, and is disposed in such a way that said position in which the refractive power in the traverse direction is greatest is at a distance from an optical axis of said first lens unit.

5. A scanning optical system as claimed in claim 4, wherein the aspherical lens included in said second lens unit is so formed that said refractive power of said aspherical lens in the traverse direction decreases symmetrically between upstream and downstream sides of the scanning path along the scanning direction with a distance in the scanning direction from a position in which the refractive power in the traverse direction is greatest.

6. A scanning optical system as claimed in claim 1, wherein the aspherical lens included in said second lens unit is disposed between said deflector and said scanning surface.

7. A scanning optical system for scanning a photosensitive body with a laser beam emitted from a laser source to form an image thereupon by means of a rotating polyhedral mirror and an imaging lens, comprising:

a first anamorphic imaging portion disposed between said laser source and said rotating polyhedral mirror, for forming the laser beam emitted from said laser source into a linear image extending in a scanning direction in which said laser beam is deflected onto a reflection surface of said rotating polyhedral mirror;

a second anamorphic imaging portion disposed between said rotating polyhedral mirror and said photosensitive body and including said imaging lens;

a first lens unit included in said imaging lens; and a second lens unit included in said imaging lens and including an aspherical lens having, in a scanning direction in which a laser beam is deflected by said rotating polyhedral mirror, no refractive power and having, in a traverse direction perpendicular to said scanning direction, refractive powers that vary asymmetrically between upstream and downstream sides of a scanning path along the scanning direction with respect to an optical axis direction of said first lens unit, wherein a magnification in the traverse direction perpendicular to the scanning direction in which the light beam is deflected by the deflector is approximately constant for both axial rays and off-axial rays in the scanning direction for any light beam deflected by said deflector irrespective of a deflection angle, and is within a range defined by a conditional expression:

$$0.5 \leq \beta s \leq 2.0$$

where $\beta s$: magnification in the traverse direction of the scanning optical system as a whole.

8. A scanning optical system as claimed in claim 7, wherein the aspherical lens included in said second lens unit is so formed that said refractive power of said aspherical lens in the traverse direction decreases with a distance in the scanning direction from a position in which the refractive power in the traverse direction is greatest.

9. A scanning optical system as claimed in claim 7, wherein the aspherical lens included in said second lens unit is disposed in such a way that a position in which its refractive power in the traverse direction is greatest is at a distance from an optical axis of said first lens unit.

10. A scanning optical system as claimed in claim 7, wherein the aspherical lens included in said second lens unit is so formed that said refractive power of said aspherical lens in the traverse direction decreases with a distance in the scanning direction from a position in which the refractive power in the traverse direction is greatest, and is disposed in such a way that said position in which the refractive power in the traverse direction is greatest is at a distance from an optical axis of said first lens unit.

11. A scanning optical system as claimed in claim 10, wherein the aspherical lens included in said second lens unit is so formed that said refractive power of said aspherical lens in the traverse direction decreases symmetrically between upstream and downstream sides of the scanning path along the scanning direction with a distance in the scanning direction from a position in which the refractive power in the traverse direction is greatest.

12. A scanning optical system for scanning a scanning surface with a light beam emitted from a light source to form an image thereupon by means of a deflector and an imaging lens, comprising:

a first imaging portion disposed between said light source and said deflector; and a second imaging portion disposed between said deflector and said scanning surface and including said imaging lens, wherein a magnification in a traverse direction perpendicular to a scanning direction in which the light beam is deflected by the deflector is approximately uniform for any light beam deflected by said deflector irrespective of a deflection angle, and is within a range defined by a conditional expression:

$$0.5 \leq \beta s \leq 2.0$$

where $\beta s$: magnification in the traverse direction of the scanning optical system as a whole.

13. A scanning optical system as claimed in claim 12, further comprising:

a first lens unit included in said imaging lens; and a second lens unit included in said imaging lens and including an aspherical lens having, in a scanning direction in which the light beam is deflected by said deflector, no refractive power and having, in the traverse direction perpendicular to said scanning direction, refractive powers that vary asymmetrically between upstream and downstream sides of a scanning path along the scanning direction with respect to an optical axis direction of said first lens unit.

14. A scanning optical system as claimed in claim 13, wherein the aspherical lens included in said second lens unit is so formed that said refractive power in said aspherical lens in the traverse direction decreases with a distance in the scanning direction from a position in which the refractive power in the traverse direction is greatest.

15. A scanning optical system as claimed in claim 13, wherein the aspherical lens included in said second lens unit is disposed in such a way that a position in which its refractive power in the traverse direction is greatest is at a distance from an optical axis of said first lens unit.

16. A scanning optical system as claimed in claim 13, wherein the aspherical lens included in said second lens unit is so formed that said refractive power of said aspherical lens in the traverse direction decreases with a distance in the scanning direction from a position in which the refractive power in the traverse direction is greatest, and is disposed in such a way that said position in which the refractive power in the traverse direction is greatest is at a distance from an optical axis of said first lens unit.

17. A scanning optical system as claimed in claim 16, wherein the aspherical lens included in said second lens unit is so formed that said refractive power of said aspherical lens in the traverse direction decreases symmetrically between upstream and downstream sides of the scanning path along the scanning direction with a distance in the scanning direction from a position in which the refractive power in the traverse direction is greatest.

18. A scanning optical system for scanning a photosensitive body with a laser beam emitted from a laser source to form an image thereupon by means of a rotating polyhedral mirror and an imaging lens, comprising:
- a first anamorphic imaging portion disposed between said laser source and said rotating polyhedral mirror, for forming the laser beam emitted from said laser source into a linear image extending in a scanning direction in which said laser beam is deflected onto a reflection surface of said rotating polyhedral mirror; and
- a second anamorphic imaging portion disposed between said rotating polyhedral mirror and said photosensitive body and including said imaging lens,
- wherein a magnification in a traverse direction perpendicular to the scanning direction in which the laser beam is deflected by the rotating polyhedral mirror is approximately uniform for any laser beam deflected by said rotating polyhedral mirror irrespective of a deflection angle, and is within a range defined a conditional expression:

$$0.5 \leq \beta s \leq 2.0$$

where
- $\beta s$: magnification in the traverse direction of the scanning optical system as a whole.

19. A scanning optical system as claimed in claim 18, further comprising:
- a first lens unit included in said imaging lens; and
- a second lens unit included in said imaging lens and including an aspherical lens having, in the scanning direction in which the laser beam is deflected by said rotating polyhedral mirror, no refractive power and having, in a traverse direction perpendicular to said scanning direction, refractive powers that vary asymmetrically between upstream and downstream sides of a scanning path along the scanning direction with respect to an optical axis direction of said first lens unit.

20. A scanning optical system as claimed in claim 19, wherein the aspherical lens included in said second lens unit is so formed that its refractive power of said aspherical lens in the traverse direction decreases with a distance in the scanning direction from a position in which the refractive power in the traverse direction is greatest.

21. A scanning optical system as claimed in claim 19, wherein the aspherical lens included in said second lens unit is disposed in such a way that a position in which its refractive power in the traverse direction is greatest is at a distance from an optical axis of said first lens unit.

22. A scanning optical system as claimed in claim 19, wherein the aspherical lens included in said second lens unit is so formed that its refractive power in the traverse direction decreases with a distance in the scanning direction from a position in which the refractive power in the traverse direction is greatest, and is disposed in such a way that said position in which the refractive power in the traverse direction is greatest is at a distance from an optical axis of said first lens unit.

23. A scanning optical system as claimed in claim 22, wherein the aspherical lens included in said second lens unit is so formed that said refractive power of said aspherical lens in the traverse direction decreases symmetrically between upstream and downstream sides of a scanning path along the scanning direction with a distance in the scanning direction from a position in which the refractive power in the traverse direction is greatest.

24. A method of scanning a scanning surface with a light beam emitted from a light source to form an image thereupon by means of a deflector and an imaging lens, comprising:
- a first step of disposing between said deflector and said scanning surface at least one scanning lens included in said imaging lens and having, in a scanning direction in which the light beam is deflected by said deflector, a refractive power; and
- a second step of disposing between said deflector and said scanning surface an aspherical lens included in said imaging lens and having, in said scanning direction, no refractive power and, in a traverse direction perpendicular to said scanning direction, refractive powers that vary asymmetrically between upstream and downstream sides of a scanning path along the scanning direction with respect to an optical axis direction of said first lens unit,
- wherein a magnification in the traverse direction perpendicular to the scanning direction in which the light beam is deflected by the deflector is approximately constant for both axial rays and off-axial rays in the scanning direction for any light beam deflected by said deflector irrespective of a deflection angle, and is within a range defined by a conditional expression:

$$0.5 \leq \beta s \leq 2.0$$

where
- $\beta s$: magnification in the traverse direction of the scanning optical system as a whole.

25. A scanning optical system for scanning a scanning surface with a light beam emitted from a light source to form an image thereupon by a deflector and an imaging lens, comprising in the imaging lens:
- an aspherical lens having, in a scanning direction in which the light beam is deflected by said deflector, no refractive power and having, in a traverse direction perpendicular to said scanning direction, refractive powers that vary asymmetrically between upstream and downstream sides of a scanning path along the scanning direction with respect to an optical axis direction of said imaging lens,
- wherein a magnification in the traverse direction perpendicular to the scanning direction in which the light beam is deflected by the deflector is approximately constant for both axial rays and off-axial rays in the scanning direction for any light beam deflected by said deflector irrespective of a deflection angle, and is within a range defined by a conditional expression:

$$0.5 \leq \beta s \leq 2.0$$

where
- $\beta s$: magnification in the traverse direction of the scanning optical system as a whole.

26. A scanning optical system for scanning a scanning surface with a light beam emitted from a light source to form an image thereupon by means of a deflector and an imaging lens, comprising:
- a first imaging portion disposed between said light source and said deflector; and
- a second imaging portion disposed between said deflector and said scanning surface and including said imaging lens, wherein said imaging lens includes:
  - a first lens unit included in said imaging lens; and a second lens unit included in said imaging lens and including an aspherical lens having, in a scanning direction in which the light beam is deflected by said deflector, no refractive power and having, in the traverse direction perpendicular to said scanning direction, refractive powers that vary asymmetrically between upstream and downstream sides of a scanning path along the scanning direction with respect to an optical axis direction of said first lens unit, wherein a magnification in a traverse direction perpendicular to the scanning direction in which the light beam is deflected by the deflector is approximately constant for both axial rays and off-axial rays in the scanning direction for any light beam deflected by said deflector irrespective of a deflection angle, and is within a range defined by a conditional expression:

$$0.5 \leq \beta s \leq 2.0$$

where $\beta s$: magnification in the traverse direction of the scanning optical system as a whole.

27. A scanning optical apparatus for forming a linear image on a scanning surface, comprising:

a deflector deflecting a light beam; and a scanning optical system focusing the light beam on the scanning surface, wherein a magnification of the imaging optical system in a traverse direction perpendicular to the scanning direction in which the light beam is deflected by the deflector is approximately uniform for any light beam deflected by the deflector irrespective of a deflection angle, and is within a range defined by a conditional expression:

$$0.5 \leq \beta s \leq 2.0$$

where $\beta s$: magnification in the traverse direction of the scanning optical system as a whole.

28. The scanning optical apparatus as claimed in claim 27, wherein the scanning optical system includes at least one aspherical surface having, in the scanning direction in which the light beam is deflected by the deflector, no power and having, in the traverse direction, power that varies asymmetrically between an upstream and downstream side of the scanning path along the scanning direction with respect to an optical axis direction of another optical surface included in the scanning optical system.

29. The scanning optical apparatus as claimed in claim 28, wherein the scanning optical system includes an aspherical lens element having the aspherical surface.

30. The scanning optical apparatus as claimed in claim 28, wherein the power of the aspherical surface in the traverse direction decreases with a distance in the scanning direction from a position in which the power in the traverse direction is greatest, and wherein the position is not disposed along the optical axis direction of said other optical surface.

31. The scanning optical apparatus as claimed in claim 30, wherein the power of the aspherical surface in the traverse direction decreases symmetrically in the scanning direction with respect to the position in which the power in the traverse direction is greatest.

32. The scanning optical apparatus as claimed in claim 30, wherein the power of the aspherical surface in the traverse direction decreases asymmetrically in the scanning direction with respect to the position in which the power in the traverse direction is greatest.

33. A scanning optical apparatus for forming a linear image on a scanning surface, comprising:

a deflector deflecting a light beam; and a scanning optical system focusing the light beam on the scanning surface, the scanning optical system including at least one aspherical surface having, in a scanning direction in which the light beam is deflected by the deflector, no power and having, in a traverse direction, power that varies asymmetrically between an upstream and downstream side of the scanning path along the scanning direction with respect to an optical axis direction of another optical surface included in the scanning optical system, and wherein a magnification of the scanning optical system in the traverse direction perpendicular to the scanning direction in which the light beam is deflected by the deflector is within a range defined by a conditional expression:

$$0.5 \leq \beta s \leq 2.0$$

where $\beta s$: magnification in the traverse direction of the scanning optical system as a whole.

34. The scanning optical apparatus as claimed in claim 30, wherein the scanning optical system includes an aspherical lens element having the aspherical surface.

35. The scanning optical apparatus as claimed in claim 33, wherein the power of the aspherical surface in the traverse direction decreases with a distance in the scanning direction from a position in which the power in the traverse direction is greatest, and wherein the position is not disposed along the optical axis direction of said other optical surface.

36. The scanning optical apparatus as claimed in claim 35, wherein the power of the aspherical surface in the traverse direction decreases symmetrically in the scanning direction with respect to the position in which the power in the traverse direction is greatest.

37. The scanning apparatus as claimed in claim 35, wherein the power of the aspherical surface in the traverse direction decreases asymmetrically in the scanning direction with respect to the position in which the power in the traverse direction is greatest.

* * * * *